US 11,009,956 B2

(12) United States Patent
Ogita et al.

(10) Patent No.: US 11,009,956 B2
(45) Date of Patent: May 18, 2021

(54) INFORMATION PROCESSING APPARATUS AND INFORMATION PROCESSING METHOD FOR PRESENTATION OF MULTIPLE HAPTIC FEEDBACK CHANNELS BASED ON SOUND CHARACTERISTICS EXTRACTED FROM MULTIPLE SOUND CHANNELS

(71) Applicant: SONY CORPORATION, Tokyo (JP)

(72) Inventors: Takeshi Ogita, Tokyo (JP); Ryo Yokoyama, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/328,913

(22) PCT Filed: Sep. 8, 2017

(86) PCT No.: PCT/JP2017/032408
§ 371 (c)(1),
(2) Date: Feb. 27, 2019

(87) PCT Pub. No.: WO2018/066299
PCT Pub. Date: Apr. 12, 2018

(65) Prior Publication Data
US 2019/0220095 A1    Jul. 18, 2019

(30) Foreign Application Priority Data

Oct. 7, 2016    (JP) .............................. JP2016-198777
May 22, 2017   (JP) .............................. JP2017-100764

(51) Int. Cl.
*G06F 3/16*      (2006.01)
*G06F 3/0346*    (2013.01)
(Continued)

(52) U.S. Cl.
CPC ............ *G06F 3/016* (2013.01); *G06F 3/0346* (2013.01); *G06F 3/03547* (2013.01); *G06F 3/165* (2013.01); *H04M 19/047* (2013.01)

(58) Field of Classification Search
CPC ........ G06F 3/011; G06F 3/016; G06F 3/0346; G06F 3/16; G06F 3/165; G08B 6/00;
(Continued)

(56) References Cited

U.S. PATENT DOCUMENTS

2010/0160016 A1*   6/2010   Shimabukuro ..... G07F 17/3211
                                                     463/16
2011/0157052 A1*   6/2011   Lee ........................ G06F 3/016
                                                     345/173

(Continued)

FOREIGN PATENT DOCUMENTS

CN    102750957 A    10/2012
CN    103247296 A    8/2013
(Continued)

OTHER PUBLICATIONS

International Search Report and Written Opinion of PCT Application No. PCT/JP2017/032408, dated Oct. 17, 2017, 09 pages of ISRWO.

*Primary Examiner* — Walter F Briney, III
(74) *Attorney, Agent, or Firm* — Chip Law Group

(57) ABSTRACT

An information processing apparatus includes an arithmetic processing unit. The arithmetic processing unit generates a first haptic-feedback presentation signal, which is to be supplied to a first haptic-feedback presentation device of a plurality of haptic-feedback presentation devices, based on the first characteristic information extracted from a first sound signal corresponding to a first channel among sounds of a plurality of channels output from a sound output device capable of outputting the sounds of the plurality of channels, and generates a second haptic-feedback presentation signal,
(Continued)

which is to be supplied to a second haptic-feedback presentation device of the plurality of haptic-feedback presentation devices, based on the second characteristic information extracted from a second sound signal corresponding to a second channel among the sounds of the plurality of channels.

12 Claims, 25 Drawing Sheets

(51) Int. Cl.
*G06F 3/01* (2006.01)
*G06F 3/0354* (2013.01)
*H04M 19/04* (2006.01)

(58) Field of Classification Search
CPC ......... G10L 21/00; G10L 21/06; G10L 21/16; G10L 21/18
See application file for complete search history.

(56) References Cited

U.S. PATENT DOCUMENTS

| | | | |
|---|---|---|---|
| 2012/0206246 A1 | 8/2012 | Cruz-Hernandez et al. | |
| 2012/0206247 A1 | 8/2012 | Bhatia et al. | |
| 2013/0022221 A1* | 1/2013 | Kallai ................... | G06F 3/162 381/300 |
| 2014/0152429 A1 | 6/2014 | Bhatia et al. | |
| 2014/0253302 A1* | 9/2014 | Levesque ................ | G06F 3/016 340/407.1 |
| 2014/0348348 A1* | 11/2014 | Efrati ...................... | H04R 3/12 381/162 |
| 2015/0070153 A1* | 3/2015 | Bhatia .................... | G06F 3/016 340/407.1 |
| 2015/0077324 A1* | 3/2015 | Birnbaum .............. | G06F 3/016 345/156 |
| 2015/0209668 A1* | 7/2015 | Obana ................... | G06F 3/0481 463/31 |
| 2015/0241975 A1 | 8/2015 | Bhatia et al. | |
| 2016/0116982 A1* | 4/2016 | Baek ...................... | H04N 9/8205 345/156 |
| 2017/0213430 A1 | 7/2017 | Bhatia et al. | |
| 2017/0256144 A1* | 9/2017 | Khoshkava ........... | G06F 3/0488 |

FOREIGN PATENT DOCUMENTS

| | | |
|---|---|---|
| CN | 104460983 A | 3/2015 |
| EP | 2487557 A2 | 8/2012 |
| EP | 2624099 A1 | 8/2013 |
| EP | 2851763 A1 | 3/2015 |
| JP | 2005-258666 A | 9/2005 |
| JP | 2012-168947 A | 9/2012 |
| JP | 2015-060591 A | 3/2015 |
| KR | 10-2012-0094849 A | 8/2012 |
| KR | 10-2013-0086590 A | 8/2013 |
| KR | 10-2015-0032475 A | 3/2015 |
| WO | 2016/092644 A1 | 6/2016 |

* cited by examiner

INFORMATION PROCESSING APPARATUS AND INFORMATION PROCESSING METHOD FOR PRESENTATION OF MULTIPLE HAPTIC FEEDBACK CHANNELS BASED ON SOUND CHARACTERISTICS EXTRACTED FROM MULTIPLE SOUND CHANNELS

CROSS REFERENCE TO RELATED APPLICATIONS

This application is a U.S. National Phase of International Patent Application No. PCT/JP2017/032408 filed on Sep. 8, 2017, which claims priority benefit of Japanese Patent Application No. JP 2016-198777 filed in the Japan Patent Office on Oct. 7, 2016 and also claims priority benefit of Japanese Patent Application No. JP 2017-100764 filed in the Japan Patent Office on May 22, 2017. Each of the above-referenced applications is hereby incorporated herein by reference in its entirety.

TECHNICAL FIELD

The present technology relates to an information processing apparatus such as a mobile apparatus, an information processing method, and a program.

BACKGROUND ART

In general, it is said that the human audible range is approximately 20 Hz to 20000 Hz, and the frequency characteristic of a digital audio signal is also set according to this. However, low bands, in particular, low frequencies of 100 Hz or lower, are said to be difficult to perceive as sound through human eardrum vibration. Further, also in speakers, there is a limit to the reproducibility of low frequency sound of 100 Hz or lower. As a measure against this, there is known a technology for replacing the woofer (bass) component of 5.1 ch audio with the vibration of a vibration device (refer to Patent Literature 1).

CITATION LIST

Patent Literature

Patent Literature 1: JP-A-2014-229312

DISCLOSURE OF INVENTION

Technical Problem

Vibration devices built into information processing apparatuses, such as smartphones, are mainly used only for responses to operations on touch sensor panels, notification at the time of arrival of incoming calls, and the like. As disclosed in Patent Literature 1, there is a technology for reproducing the woofer (bass) component of 5.1 ch audio by vibration. However, the technology for further effectively applying the vibration device in the information processing apparatus is still insufficient.

In view of the circumstances described above, it is an object of the present technology to provide an information processing apparatus, an information processing method, and a program capable of improving functions, operability, and the like by using vibration.

Solution to Problem

In order to solve the aforementioned problem, an information processing apparatus according to the present technology includes an arithmetic processing unit. The arithmetic processing unit generates a first haptic-feedback presentation signal, which is to be supplied to a first haptic-feedback presentation device of a plurality of haptic-feedback presentation devices, on the basis of first characteristic information extracted from a first sound signal corresponding to a first channel among sounds of a plurality of channels output from a sound output device capable of outputting the sounds of the plurality of channels, and generates a second haptic-feedback presentation signal, which is to be supplied to a second haptic-feedback presentation device of the plurality of haptic-feedback presentation devices, on the basis of second characteristic information extracted from a second sound signal corresponding to a second channel among the sounds of the plurality of channels.

In the information processing apparatus described above, the arithmetic processing unit may extract a first low frequency component signal belonging to a frequency band of a predetermined frequency or lower from the first sound signal as the first characteristic information.

In the information processing apparatus described above, the arithmetic processing unit may extract a second low frequency component signal belonging to a frequency band of a predetermined frequency or lower from the second sound signal as the second characteristic information.

In the information processing apparatus described above, the first haptic-feedback presentation device and the second haptic-feedback presentation device may be disposed at distant positions, and the arithmetic processing unit may generate, as the first haptic-feedback presentation signal, a signal obtained by adding a first opposite phase signal, which is a signal having an opposite phase to the second low frequency component signal and corresponds to an amplitude of vibration output from the second haptic-feedback presentation device on the basis of the second low frequency component signal, to the first low frequency component signal, the amplitude of the vibration being attenuated along with transmission to the first haptic-feedback presentation device.

In the information processing apparatus described above, the first haptic-feedback presentation device and the second haptic-feedback presentation device may be disposed at distant positions, and the arithmetic processing unit may generate, as the second haptic-feedback presentation signal, a signal obtained by adding a second opposite phase signal, which is a signal having an opposite phase to the first low frequency component signal and corresponds to an amplitude of vibration output from the first haptic-feedback presentation device on the basis of the first low frequency component signal, to the second low frequency component signal, the amplitude of the vibration being attenuated along with transmission to the second haptic-feedback presentation device.

In the information processing apparatus described above, the plurality of haptic-feedback presentation devices may be provided in a housing, and the arithmetic processing unit may determine whether a direction in a positional relationship between the plurality of haptic-feedback presentation devices depending on a direction of a posture of the housing is close to either a direction of gravity or a horizontal direction and generate the first haptic-feedback presentation signal on the basis of the first characteristic information and generate the second haptic-feedback presentation signal on the basis of the second characteristic information in a case where it is determined that the direction in the positional relationship is close to the horizontal direction.

In the information processing apparatus described above, in a case where it is determined that the direction in the positional relationship is close to the direction of gravity, the arithmetic processing unit may generate a monaural sound signal from sound signals of the plurality of channels and generate the first haptic-feedback presentation signal and the second haptic-feedback presentation signal on the basis of the monaural sound signal.

In the information processing apparatus described above, the arithmetic processing unit may extract third characteristic information from the monaural sound signal and generate the first haptic-feedback presentation signal and the second haptic-feedback presentation signal on the basis of the third characteristic information.

In the information processing apparatus described above, the arithmetic processing unit may extract a third low frequency component signal belonging to a frequency band of a predetermined frequency or lower from the monaural sound signal as the third characteristic information.

In the information processing apparatus described above, the arithmetic processing unit may generate the third low frequency component signal as the first haptic-feedback presentation signal and generate a signal having an opposite phase to the third low frequency component signal as the second haptic-feedback presentation signal.

In the information processing apparatus described above, the plurality of haptic-feedback presentation devices may be provided in first and second end portions in a housing including a display device, the first and second end portions being both end portions in one coordinate axis direction of the display device.

In the information processing apparatus described above, the plurality of haptic-feedback presentation devices may be provided in a wearable device.

In the information processing apparatus described above, the plurality of haptic-feedback presentation devices may be provided in a belt-type wearable device.

In the information processing apparatus described above, the plurality of haptic-feedback presentation devices may be provided on a first side and a second side opposite to the first side when the belt is mounted on a body of a user.

An information processing method according to the present technology includes: generating a first haptic-feedback presentation signal, which is to be supplied to a first haptic-feedback presentation device of a plurality of haptic-feedback presentation devices, on the basis of first characteristic information extracted from a first sound signal corresponding to a first channel, among sounds of a plurality of channels output from a sound output device capable of outputting the sounds of the plurality of channels, by an arithmetic processing unit; and generating a second haptic-feedback presentation signal, which is to be supplied to a second haptic-feedback presentation device of the plurality of haptic-feedback presentation devices, on the basis of second characteristic information extracted from a second sound signal corresponding to a second channel, among the sounds of the plurality of channels, by the arithmetic processing unit.

A program according to the present technology causes a computer to function as an arithmetic processing unit that generates a first haptic-feedback presentation signal, which is to be supplied to a first haptic-feedback presentation device of a plurality of haptic-feedback presentation devices, on the basis of first characteristic information extracted from a first sound signal corresponding to a first channel among sounds of a plurality of channels output from a sound output device capable of outputting the sounds of the plurality of channels and generates a second haptic-feedback presentation signal, which is to be supplied to a second haptic-feedback presentation device of the plurality of haptic-feedback presentation devices, on the basis of second characteristic information extracted from a second sound signal corresponding to a second channel among the sounds of the plurality of channels.

An information processing apparatus according to the present technology includes a control unit. The control unit receives a request from an information processing terminal through a network, generates a first haptic-feedback presentation signal, which is to be supplied to a first haptic-feedback presentation device of a plurality of haptic-feedback presentation devices, on the basis of first characteristic information extracted from a first sound signal corresponding to a first channel among sounds of a plurality of channels output from a sound output device capable of outputting the sounds of the plurality of channels and generates a second haptic-feedback presentation signal, which is to be supplied to a second haptic-feedback presentation device of the plurality of haptic-feedback presentation devices, on the basis of second characteristic information extracted from a second sound signal corresponding to a second channel among the sounds of the plurality of channels, and transmits information of the first haptic-feedback presentation signal and the second haptic-feedback presentation signal to the information processing terminal through the network.

An information processing apparatus according to another aspect of the present technology includes: a housing; a display device having a display screen on which an image can be displayed; two vibration devices provided in first and second end portions that are both end portions of the housing in one coordinate axis direction of the display screen; and an arithmetic processing unit that performs control to vibrate the two vibration devices with a time difference therebetween according to movement of an object displayed on the display screen of the display device.

In this information processing apparatus, the arithmetic processing unit may be configured to vibrate the two vibration devices at different frequencies.

An information processing apparatus according to still another aspect of the present technology includes: a housing; a display device having a display screen on which an image can be displayed; a touch sensor panel provided so as to overlap the display device; two vibration devices that are provided in first and second end portions, which are both end portions of the housing in one coordinate axis direction of the display screen, and that vibrate in at least the other coordinate axis direction of the display screen; and an arithmetic processing unit that performs control to vibrate the two vibration devices in the same phase in a case where a touch operation on the touch sensor panel is detected when an operation screen is displayed on the display device.

Advantageous Effects of Invention

As described above, according to the present technology, it is possible to improve functions, operability, and the like by using vibration.

MODE(S) FOR CARRYING OUT THE INVENTION

Hereinafter, embodiments of the present technology will be described with reference to the diagrams.

First Embodiment

Hereinafter, an embodiment of the present technology will be described with reference to the diagrams.

In the present embodiment, the present technology is applied to an information processing apparatus, such as a portable type mobile apparatus (for example, a smartphone) or a wearable type mobile apparatus.

[Configuration of Information Processing Apparatus]

Figure 1:
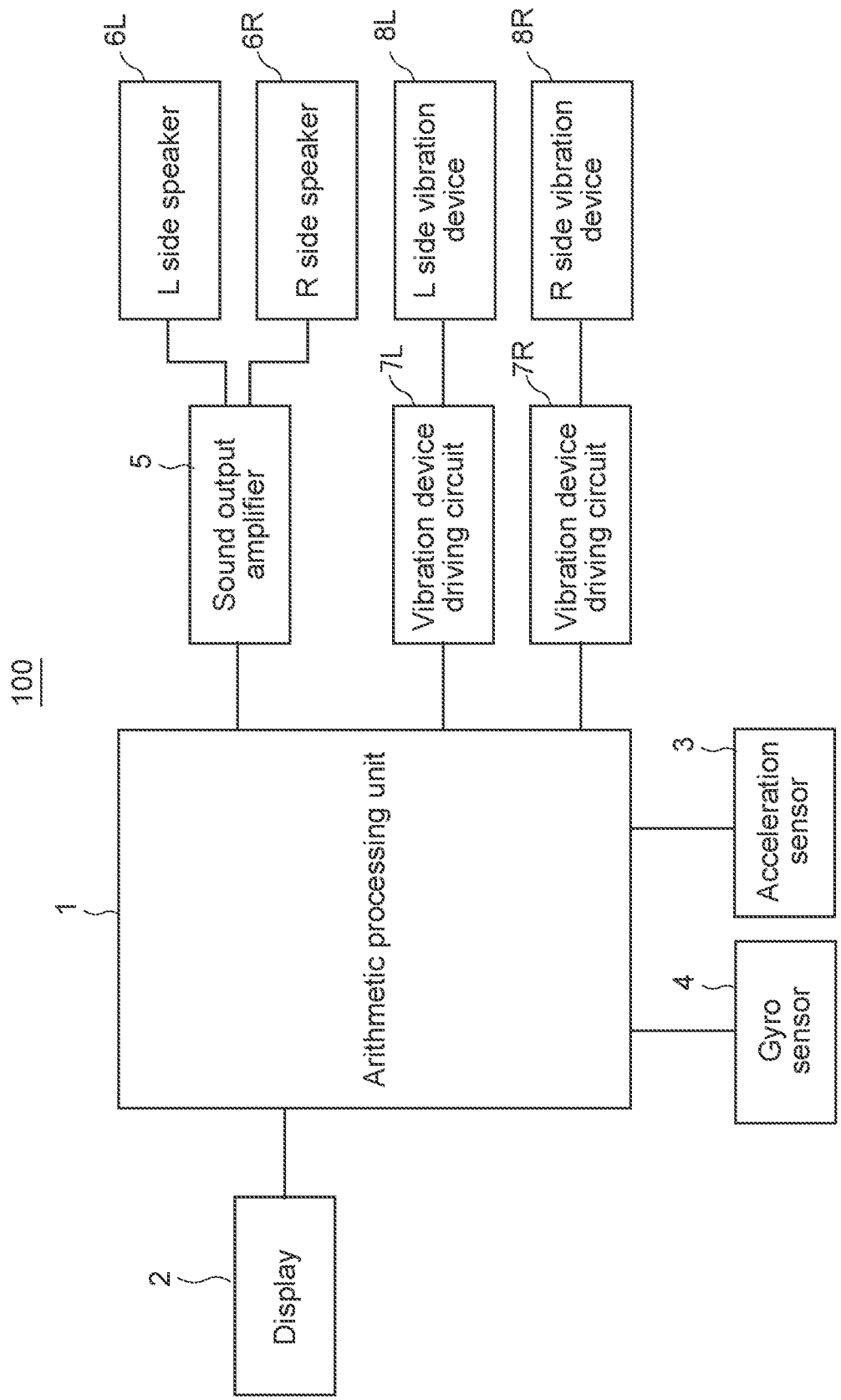
FIG. 1 is a block diagram showing the hardware configuration of an information processing apparatus according to a first embodiment of the present technology.

FIG. 1 is a block diagram showing the hardware configuration of an information processing apparatus according to a first embodiment of the present technology.

As shown in the diagram, this information processing apparatus 100 includes an arithmetic processing unit 1, a display 2, an acceleration sensor 3, a gyro sensor 4, a sound output amplifier 5, an L (left) side speaker 6L (sound output device), an R (right) side speaker 6R (sound output device), an L-side-vibration-device driving circuit 7L, an R-side-vibration-device driving circuit 7R, an L side vibration device 8L (haptic-feedback presentation device), an R side vibration device 8R (haptic-feedback presentation device), and the like.

The arithmetic processing unit 1 is configured to include a central processing unit (CPU), a random access memory (RAM), a read only memory (ROM), a flash ROM, and the like. The CPU executes arithmetic processing for executing an operating system and an application program loaded into the main memory region of the RAM from the ROM and the flash ROM. Specifically, the CPU performs display control of the display 2 connected to the arithmetic processing unit 1, processing on a video captured by a camera unit (not shown), processing on acceleration data generated by the acceleration sensor 3, processing on proximity data generated by a proximity sensor (not shown), processing on angular acceleration data generated by the gyro sensor 4, and the like. Furthermore, the CPU controls the L-side-vibration-device driving circuit 7L and the R-side-vibration-device driving circuit 7R so that the L side vibration device 8L and the R side vibration device 8R vibrate with target vibration waveforms.

The display 2 has a panel type display unit that displays an image and a display driving circuit that generates a signal to be output to the display unit on the basis of display data supplied from the arithmetic processing unit 1. Note that, a touch sensor panel that generates a coordinate signal touched by the user and supplies the coordinate signal to the arithmetic processing unit 1 may be provided in the display unit of the display 2.

The acceleration sensor 3 is a sensor that detects the acceleration in three axial directions (xyz axis directions) applied to the information processing apparatus 100. Biaxial directions of horizontal and vertical directions on the screen of the display 2 of the information processing apparatus 100 are assumed to be the x axis direction and the y axis direction, and a direction perpendicular to the x axis direction and the y axis direction is assumed to be the z axis direction.

The gyro sensor 4 is a sensor that detects the angular acceleration around each of the three axes (xyz axes) given to the information processing apparatus 100. Angular acceleration data detected by the gyro sensor 4 is used in processing of the arithmetic processing unit 1, for example, in detection of the posture of the information processing apparatus 100 or shake correction.

The sound output amplifier 5 generates a signal for driving the L side speaker 6L from the L side sound data supplied from the arithmetic processing unit 1 and also generates a signal for driving the R side speaker 6R from the R side sound data supplied from the arithmetic processing unit 1.

The L side vibration device 8L and the R side vibration device 8R are devices that generate vibration in the information processing apparatus 100. In the present embodiment, a vibration device having a structure capable of generating an arbitrary vibration waveform with high degree of freedom by varying vibration time, vibration frequency, vibration amplitude, and the like is used. For example, a vibration device such as a linear vibrator or a piezoelement is used.

The L-side-vibration-device driving circuit 7L supplies a driving signal to the L side vibration device 8L on the basis of the L side vibration data supplied from the arithmetic processing unit 1.

The R-side-vibration-device driving circuit 7R supplies a driving signal to the R side vibration device 8R on the basis of the R side vibration data supplied from the arithmetic processing unit 1.

Regarding the control of the L side vibration device 8L and the R side vibration device 8R, the arithmetic processing unit 1 is configured to generate a vibration waveform of each of the L side vibration device 8L and the R side vibration device 8R from the output stereo sound signal. A method of generating the vibration waveform of each of the vibration devices 8L and 8R will be described later.

[Arrangement and Vibration Direction of Two Vibration Devices]

Figure 2:
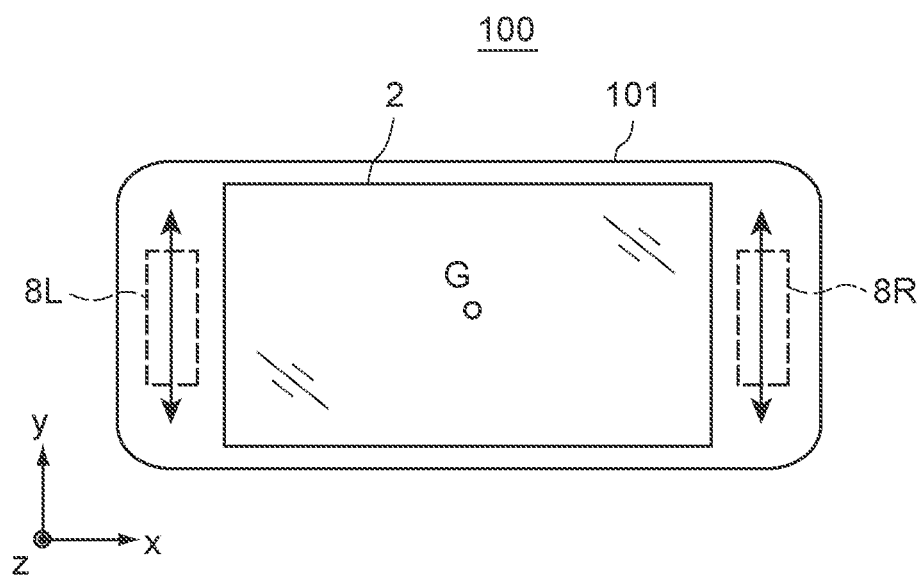
FIG. 2 is a diagram showing examples of the arrangement and vibration directions of an L side vibration device and an R side vibration device in the information processing apparatus shown in FIG. 1.

FIG. 2 is a diagram showing an example of an arrangement and vibration direction of the L side vibration device 8L and the R side vibration device 8R in a case where the information processing apparatus 100 according to the present technology is configured as a smartphone.

Here, between the biaxial directions of the horizontal and vertical directions on the screen of the display 2 of the information processing apparatus 100, the longer direction is assumed to be the x direction and the shorter direction is assumed to be the y direction.

In this example, the L side vibration device 8L and the R side vibration device 8R are disposed in both end portions of a housing 101 of the information processing apparatus 100 in the x direction. The vibration direction of the L side vibration device 8L and the R side vibration device 8R is the y direction. Accordingly, the L side vibration device 8L and the R side vibration device 8R can be disposed as far as possible from the center of gravity G of the information processing apparatus 100, and the vibration direction of the L side vibration device 8L and the R side vibration device 8R is a direction perpendicular to a straight line connecting the positions of the L side vibration device 8L and the R side vibration device 8R and the center of gravity G. Therefore, since a moment of force is generated by the vibration of the L side vibration device 8L and the R side vibration device 8R, vibration of larger energy can be generated.

Figure 3:
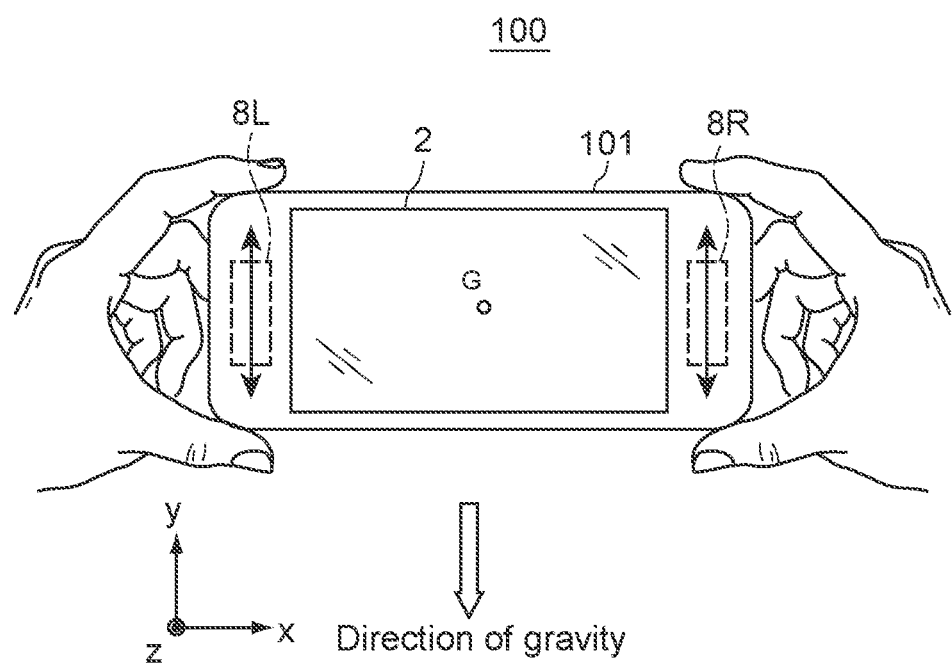
FIG. 3 is a diagram showing a state in which a user holds the information processing apparatus shown in FIG. 1 with both hands.

Further, as shown in FIG. 3, in a case where the user holds both the end portions of the housing 101 of the information processing apparatus 100 in the x direction with the right and left hands in an approximately horizontal posture, vibration in a direction approximately along the direction of gravity is transmitted to the user's hands. Here, since a person has higher sensitivity to vibration in the direction of gravity than the sensitivity to vibration in the horizontal direction, vibration can be given to the user with higher sensitivity.

Further, although the vibration direction of the L side vibration device 8L and the R side vibration device 8R is a direction (y direction) perpendicular to the straight line connecting the positions of the L side vibration device 8L and the R side vibration device 8R and the center of gravity G in FIG. 2, the L side vibration device 8L and the R side vibration device 8R may be vibrated in a direction including at least a component in the y direction. Alternatively, the L side vibration device 8L and the R side vibration device 8R may be vibrated in the x direction. Therefore, it is possible to give the user a feeling that the housing 101 of the information processing apparatus 100 expands and contracts in the x direction. Furthermore, the L side vibration device 8L and the R side vibration device 8R may be vibrated in the z axis direction.

Further, the L side vibration device 8L and the R side vibration device 8R may be disposed in both end portions of the housing 101 of the information processing apparatus 100 in the y direction. Alternatively, the L side vibration device 8L and the R side vibration device 8R may be configured by a plurality of vibration devices.

[Generation of Vibration Waveform from Stereo Sound]

Next, an operation of the arithmetic processing unit 1 for generating vibration waveforms of the L side vibration device 8L and the R side vibration device 8R from stereo sound signals to be output to the L side speaker 6L and the R side speaker 6R will be described.

In general, it is said that the human audible range is approximately 20 Hz to 20000 Hz, and the frequency characteristic of the digital audio signal is also set according to this. However, low bands, in particular, low frequencies of 100 Hz or lower, are said to be difficult to perceive as sound through human eardrum vibration. Further, also in speakers, there is a limit to the reproducibility of low frequency sound of 100 Hz or lower. As a measure against this, there is known a technology of replacing the woofer (bass) component of 5.1 ch audio with the vibration of a vibration device (refer to Patent Literature 1). However, with this method, vibration of only 1 ch is generated. With the vibration of 1 ch, there is a limit to the extensibility in the case of expressing information by vibration.

On the other hand, in the information processing apparatus 100 according to the present embodiment, the arithmetic processing unit 1 generates an L side vibration waveform and an R side vibration waveform from stereo sound signals, which are to be output to the L side speaker 6L and the R side speaker 6R, separately for the L and R sides as follows.

Figure 4:
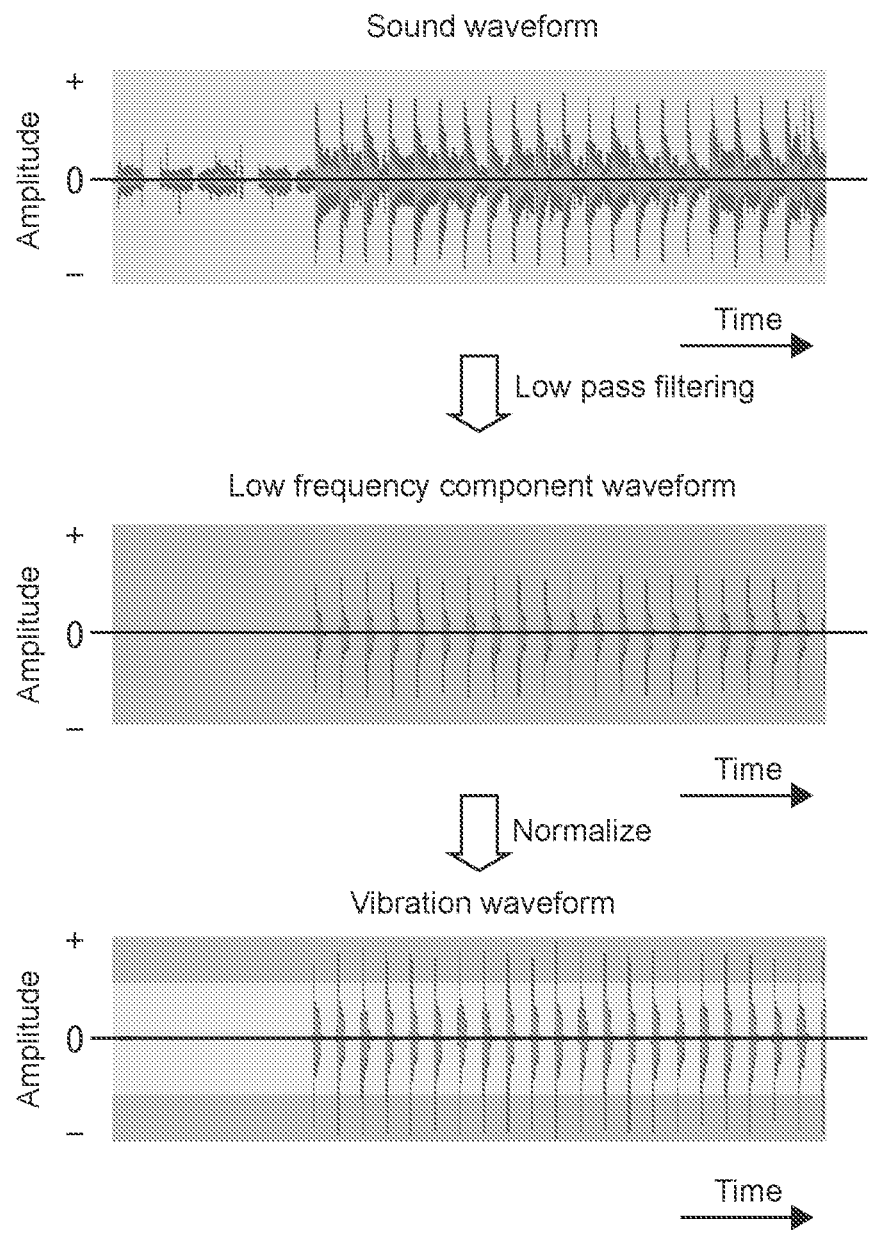
FIG. 4 is a waveform diagram showing processing until vibration waveforms on R and L sides are generated from stereo sound signals.

FIG. 4 is a waveform diagram showing processing until vibration waveforms on the R and L sides are generated from stereo sound signals.

The arithmetic processing unit 1 extracts a predetermined low frequency component signal from signals of stereo sound (sound of a plurality of channels) reproduced from, for example, a file stored in a memory or streaming received information. More specifically, the arithmetic processing unit 1 extracts a low frequency component signal of, for example, 100 Hz or lower (first low frequency component signal belonging to a frequency band of a predetermined frequency or lower: first characteristic information) from the L side sound signal (first sound signal corresponding to a first channel), and extracts a low frequency component signal of, for example, 100 Hz or lower (second low frequency component signal belonging to a frequency band of a predetermined frequency or lower: second characteristic information) from the R side sound signal (second sound signal corresponding to a second channel).

Note that, the reproduced stereo sound signal is amplified by the sound output amplifier 5 and output to the L side speaker 6L and the R side speaker 6R.

Then, the arithmetic processing unit 1 normalizes the low frequency component signal extracted from the L side sound signal so as to have a level or a waveform suitable for driving the vibration device. Similarly, the low frequency component signal extracted from the R side sound signal is similarly normalized.

As described above, the L side vibration waveform and the R side vibration waveform are generated. Data (first haptic-feedback presentation signal) of the generated L side vibration waveform is supplied to the L-side-vibration-device driving circuit 7L, and the L side vibration device 8L is driven. Similarly, data (second haptic-feedback presentation signal) of the generated R side vibration waveform is supplied to the R-side-vibration-device driving circuit 7R, and the R side vibration device 8R is driven.

Therefore, since the L side vibration device 8L vibrates in synchronization with the low frequency component signal of the L side sound and the R side vibration device 8R vibrates in synchronization with the low frequency component signal of the R side sound, stereo vibration synchronized with stereo sound is realized. As a result, since the low frequency component of the stereo sound is output as both sound and vibration, a sufficient stereo feeling can be given to the user.

[Canceling of Extra Vibrations on L and R Sides]

Figure 5:
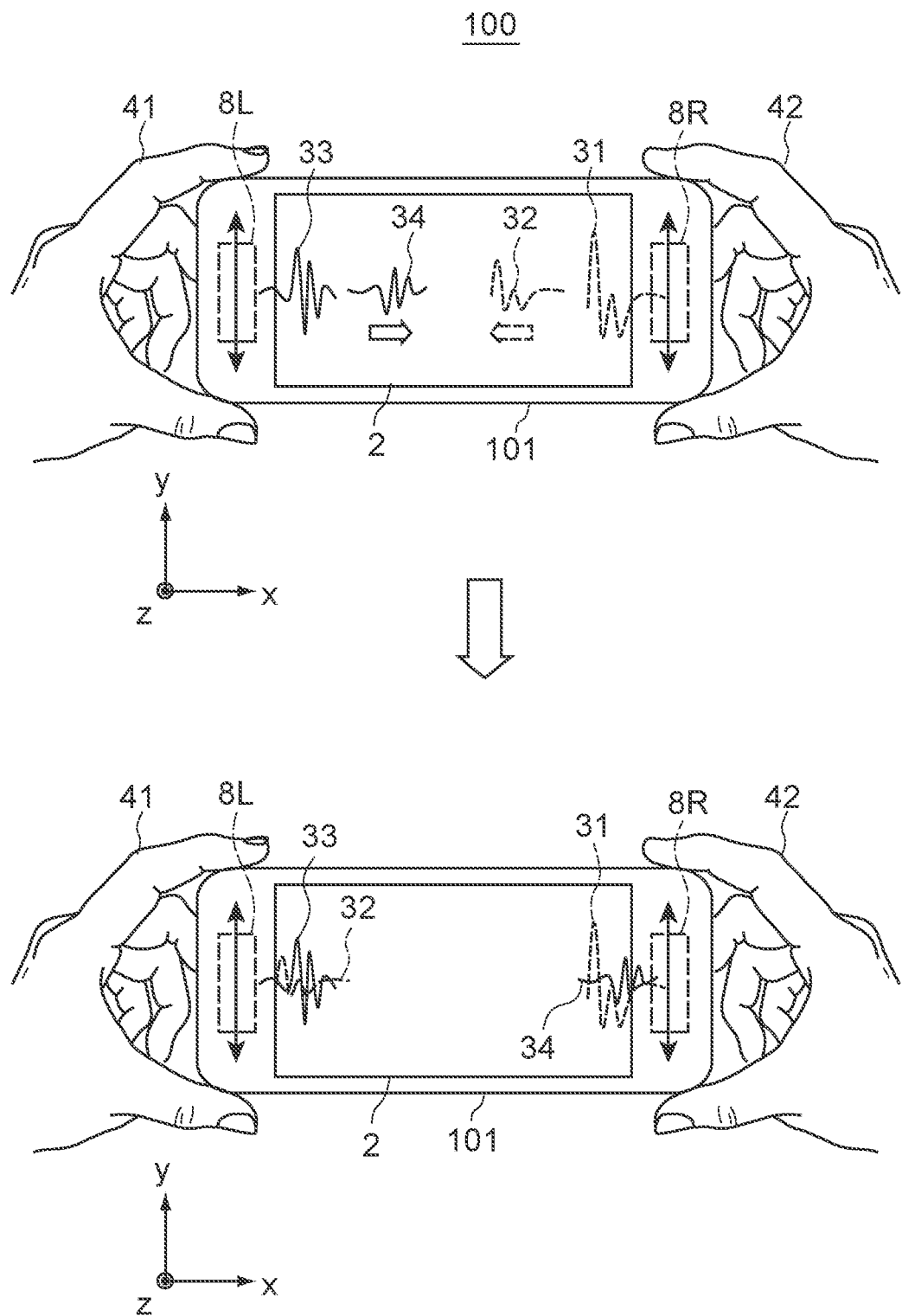
FIG. 5 is a diagram for explaining vibration noise generated in the case of vibrating the L side vibration device and the R side vibration device.

As shown in FIG. 5, in a case where the user holds both end portions of the information processing apparatus 100 in the x direction with both hands, vibration 31 of the R side vibration device 8R attenuates and is transmitted as vibration noise to the user's left hand 41, and conversely vibration 33 of the L side vibration device 8L attenuates and is transmitted as vibration noise 34 to the user's right hand. These vibration noises 32 and 34 become obstacles to providing clear stereo vibration to the user.

Figure 6:
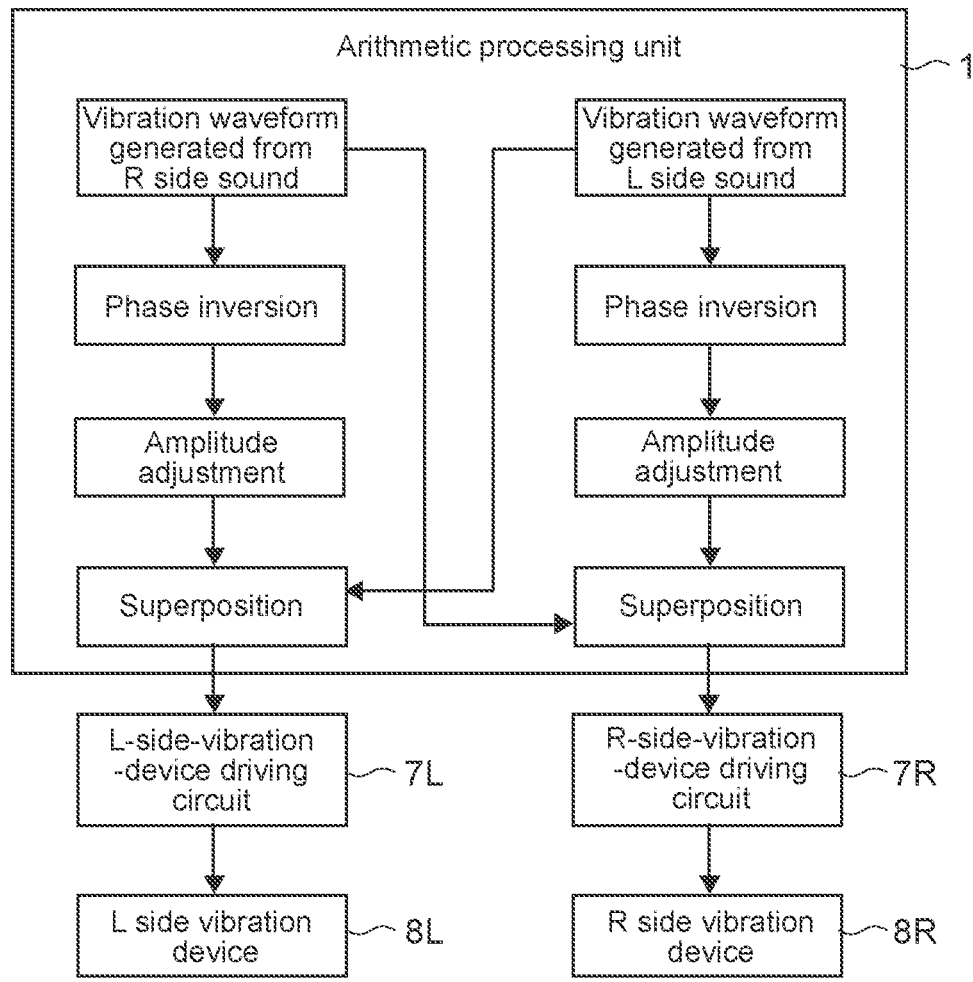
FIG. 6 is a diagram showing the configuration of a portion, which generates vibration waveforms capable of canceling vibration noise, in an arithmetic processing unit.

FIG. 6 is a diagram showing the configuration of a portion, which generates vibration waveforms capable of canceling the above-described vibration noises 32 and 34, in the arithmetic processing unit 1.

The arithmetic processing unit 1 generates a waveform having an opposite phase to the R side vibration waveform generated from the low frequency component of the R side sound of the stereo sound. Then, the arithmetic processing unit 1 adjusts the amplitude of the waveform having an opposite phase so as to match the value of vibration amplitude transmitted with attenuation from the R side vibration device 8R to the L side end portion of the housing 101 of the information processing apparatus 100 (that is, amplitude of vibration transmitted with attenuation from the R side vibration device 8R to the L side vibration device 8L). As a result, a waveform for noise cancellation that has an opposite phase to the vibration noise 32 and an amplitude approximately equal to the vibration noise 32 (first opposite phase signal: a signal having an opposite phase to the low frequency component signal of the R side sound and a signal in which the amplitude of vibration output from the R side vibration device 8R on the basis of the low frequency component signal of the R side sound corresponds to the amplitude of vibration attenuated along with transmission to the L side vibration device 8L) is obtained. Then, the arithmetic processing unit 1 adds the waveform for noise cancellation to the L side vibration waveform generated from the low frequency component of the L side sound of the stereo sound, and sets the result as the vibration waveform of the L side vibration device 8L.

This is the same for the case of generating the R side vibration waveform. That is, the arithmetic processing unit 1 generates a waveform having an opposite phase to the L side vibration waveform generated from the low frequency component of the L side sound of the stereo sound. Then, the arithmetic processing unit 1 adjusts the amplitude of the waveform having an opposite phase so as to match the value of vibration amplitude transmitted with attenuation from the L side vibration device 8L to the R side end portion of the housing 101 of the information processing apparatus 100 (that is, amplitude of vibration transmitted with attenuation from the L side vibration device 8L to the R side vibration device 8R). As a result, a waveform for noise cancellation that has an opposite phase to the vibration noise 34 and an amplitude approximately equal to the vibration noise 34 (second opposite phase signal: a signal having an opposite phase to the low frequency component signal of the L side sound and a signal in which the amplitude of vibration output from the L side vibration device 8L on the basis of the low frequency component signal of the L side sound corresponds to the amplitude of vibration attenuated along with transmission to the R side vibration device 8R) is obtained. Then, the arithmetic processing unit 1 adds the waveform for noise cancellation to the R side vibration waveform generated from the low frequency component of the R side sound of the stereo sound, and sets the result as the vibration waveform of the R side vibration device 8R.

As described above, in the information processing apparatus 100 according to the present embodiment, the vibration noise 32 transmitted to the left end portion of the housing 101 by the vibration 31 of the R side vibration device 8R is cancelled out by the waveform component for noise cancellation superimposed on the vibration waveform of the L side vibration device 8L. Similarly, the vibration noise 34 transmitted to the right end portion of the housing 101 by the vibration 33 of the L side vibration device 8L is cancelled out by the waveform component for noise cancellation superimposed on the vibration waveform of the R side vibration device 8R. By canceling out the vibration noises 32 and 34 in this manner, clear stereo vibration can be provided to the user.

[Switching Between Stereo Vibration and Monaural Vibration]

Figure 7:
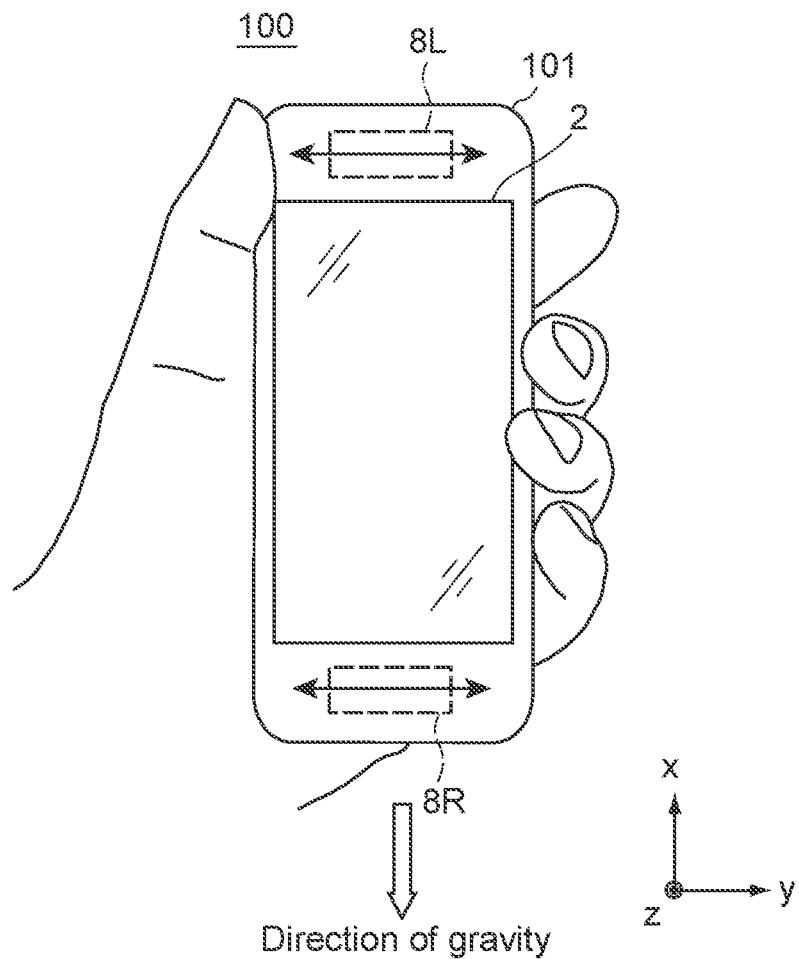
FIG. 7 is a diagram showing a state in which a user holds the information processing apparatus shown in FIG. 1 with one hand.

As shown in FIG. 7, in a case where the information processing apparatus 100 is held with one hand, the user receives a stereo vibration with one hand. For this reason, a clear stereo feeling is not obtained, and there is also a possibility that the sense of synchronization with the output sound will collapse.

Therefore, the arithmetic processing unit 1 of the information processing apparatus 100 according to the present embodiment is configured to determine whether a direction in the positional relationship between the two vibration devices 8L and 8R depending on the direction of the housing 101 of the information processing apparatus 100 is close to either the direction of gravity or the horizontal direction and to switch the method of generating vibration waveforms on the L and R sides between a case where it is determined that the direction in the positional relationship between the two vibration devices 8L and 8R is close to the horizontal direction and a case where it is determined that the direction in the positional relationship between the two vibration devices 8L and 8R is close to the direction of gravity.

Figure 8:
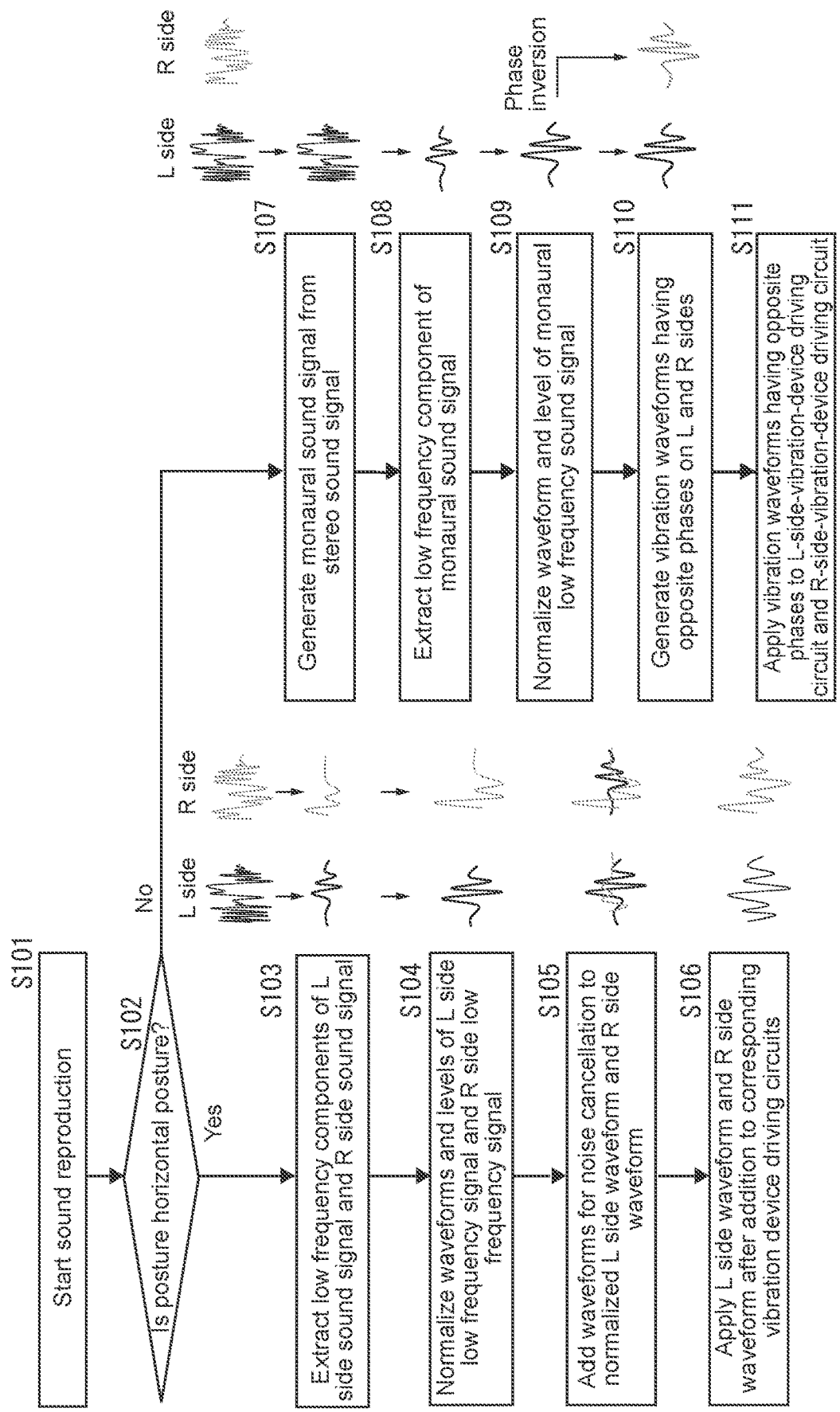
FIG. 8 is a flowchart showing a method of generating vibration waveforms on the L and R sides corresponding to a direction of a housing of the information processing apparatus.

FIG. 8 is a flowchart showing a method of generating vibration waveforms on the L and R sides corresponding to the direction of the housing 101 of the information processing apparatus 100.

With the start of reproduction of stereo sound (step S101), the arithmetic processing unit 1 determines the posture of the information processing apparatus 100 on the basis of the output of the gyro sensor 4 (step S102). More specifically, for example, as shown in FIG. 7, in a case where the information processing apparatus 100 is held with one hand, the x direction of the information processing apparatus 100 is a direction approximately along the direction of gravity. In this case, therefore, the arithmetic processing unit 1 determines that the housing 101 of the information processing apparatus 100 is in the vertical posture. Conversely, as shown in FIG. 3, in a case where the information processing apparatus 100 is held with both hands, the y direction of the information processing apparatus 100 is a direction approximately along the direction of gravity. In this case, therefore, the arithmetic processing unit 1 determines that the housing 101 of the information processing apparatus 100 is in the horizontal posture.

The operation in a case where it is determined that the information processing apparatus 100 is in the horizontal posture since the information processing apparatus 100 is held with both hands has already been described. That is, the arithmetic processing unit 1 extracts a predetermined low frequency component from each of the L side sound signal and the R side sound signal reproduced in step S101 (step S103). Then, the arithmetic processing unit 1 normalizes the extracted L side sound signal and R side sound signal so as to have a level or a waveform suitable for driving the vibration devices 8L and 8R (step S104).

Then, the arithmetic processing unit 1 adds a waveform for noise cancellation to each of the normalized L side waveform and R side waveform (step S105). The arithmetic processing unit 1 applies the L side waveform and the R side waveform after addition waveform to the corresponding vibration device driving circuits 7L and 7R, respectively (step S106).

Next, an operation in a case where it is determined that the information processing apparatus 100 is in the vertical posture since the information processing apparatus 100 is held with one hand will be described.

The arithmetic processing unit 1 generates a monaural sound signal from the stereo sound signal (step S107). The monaural sound signal is obtained by mixing the L side sound signal and the R side sound signal, for example. Alternatively, a monaural sound signal may be generated from one of the L side sound signal and the R side sound signal. Note that, FIG. 8 shows a case where a monaural sound signal is generated from the L side sound signal.

Then, the arithmetic processing unit 1 extracts a predetermined low frequency component (third low frequency component signal belonging to a frequency band of a predetermined frequency (for example, 100 Hz) or lower: third characteristic information) from the generated monaural sound signal (step S108). Then, the arithmetic processing unit 1 normalizes the extracted monaural low frequency signal so as to have a level or a waveform suitable for driving the vibration devices 8L and 8R (step S109).

Then, the arithmetic processing unit 1 generates a waveform having an opposite phase to the normalized waveform (step S110), and applies the vibration waveforms having opposite phases to the L-side-vibration-device driving circuit 7L and the R-side-vibration-device driving circuit 7R, respectively (step S111).

Figure 9:
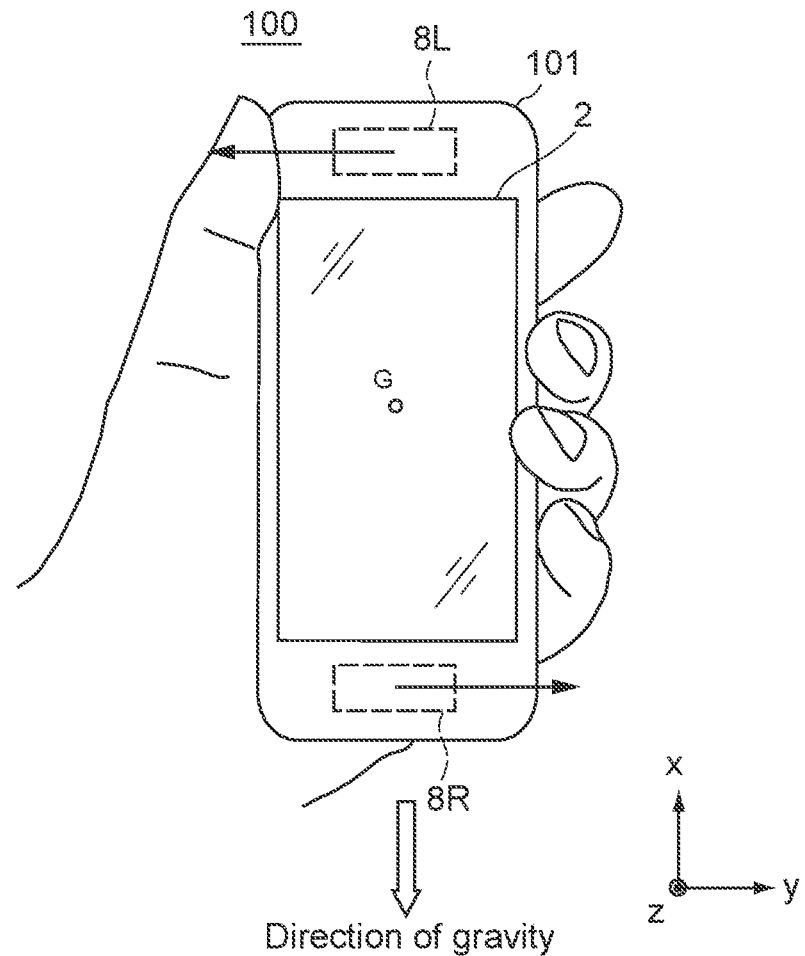
FIG. 9 is a diagram showing a vibration direction of each vibration device when a user holds the information processing apparatus shown in FIG. 1 with one hand.

As a result, since the L side vibration device 8L and the R side vibration device 8R vibrate with vibration waveforms having opposite phases, for example, as shown in FIG. 9, rightward acceleration is applied to the lower portion of the housing 101 of the information processing apparatus 100 when leftward acceleration is applied to the upper portion of the housing 101 of the information processing apparatus 100, and conversely leftward acceleration is applied to the lower portion of the housing 101 of the information processing apparatus 100 when rightward acceleration is applied to the upper portion of the housing 101 of the information processing apparatus 100. Therefore, compared with a case where the L side vibration device 8L and the R side vibration device 8R vibrate in the same phase, a large sense of vibration can be given to the user's hand holding the information processing apparatus 100.

[Application Example of Opposite Phase Vibrations of L Side Vibration Device and R Side Vibration Device]

As described above, the technology of vibrating the L side vibration device 8L and the R side vibration device 8R in opposite phases to give a strong sense of vibration to the user's hand can also be applied to a case where notification of some information is provided to the user through the vibration of the information processing apparatus 100. For example, the technology can be used for telephone, e-mail, and SNS message arrival, alarm notification of a schedule, and other notifications of information from various applications to the user.

Figure 10:
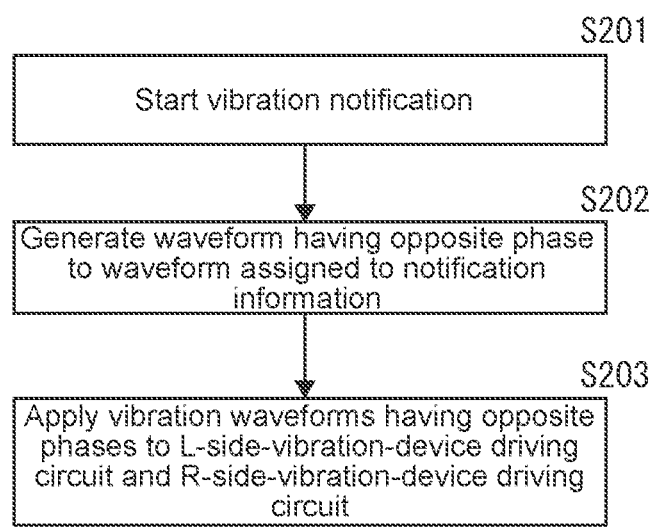
FIG. 10 is a flowchart showing a procedure of generating a vibration waveform by vibration notification.

FIG. 10 is a flowchart showing a procedure of generating a vibration waveform by vibration notification.

When the conditions for starting the vibration notification are satisfied, for example, at the time of arrival of an incoming call (step S201), the arithmetic processing unit 1 generates a waveform having an opposite phase to the waveform assigned to the notification information (step S202), and applies one of the waveforms and the other waveform having an opposite phase to the corresponding vibration device driving circuits 7L and 7R as the vibration waveform of the L side vibration device 8L and the vibration waveform of the R side vibration device 8R, respectively (step S203). As a result, the L side vibration device 8L and the R side vibration device 8R vibrate in opposite phases.

In this manner, by vibrating the L side vibration device 8L and the R side vibration device 8R in opposite phases, it is possible to notify the user of information with larger vibration.

Note that, although the L side vibration device 8L and the R side vibration device 8R are vibrated in the y direction herein, the L side vibration device 8L and the R side vibration device 8R may be vibrated in a direction including at least a component in the y direction. Alternatively, the L side vibration device 8L and the R side vibration device 8R may be vibrated in the x direction. Therefore, it is possible to give the user a feeling that the housing 101 of the information processing apparatus 100 expands and contracts in the x direction. Furthermore, the vibration devices 8L and 8R may be vibrated in the z axis direction.

[Same Phase Vibration of L Side Vibration Device and R Side Vibration Device]

Figure 11:
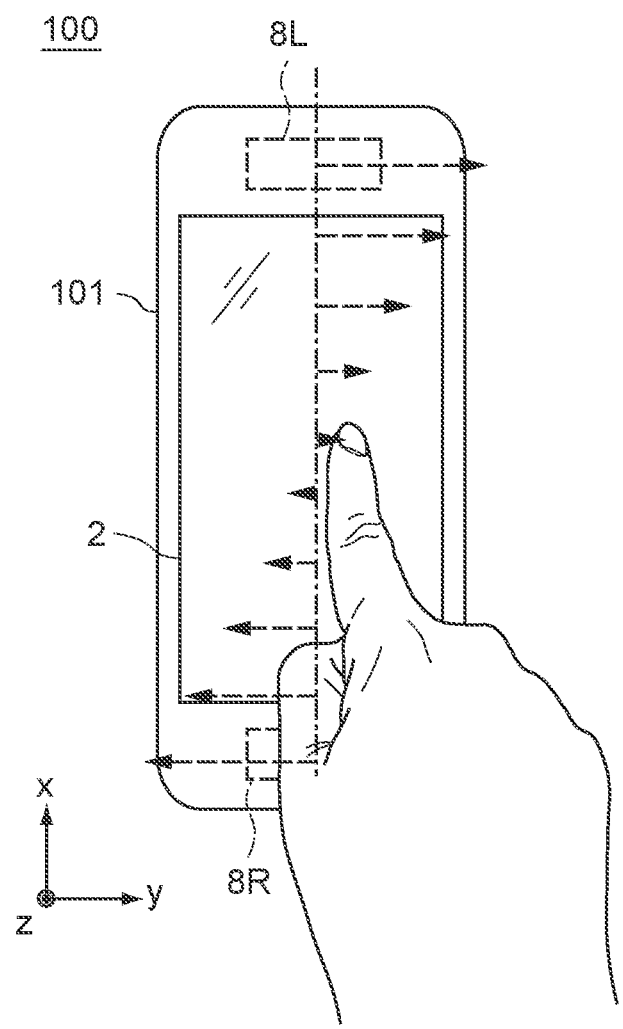
FIG. 11 is a diagram showing the distribution of the magnitude of vibration on a touch sensor panel surface in a case where the L side vibration device and the R side vibration device are vibrated in opposite phases.

Incidentally, when the L side vibration device 8L and the R side vibration device 8R are vibrated in opposite phases, as shown in FIG. 11, the number of vibration components canceling each other out in a center portion of the housing 101 of the information processing apparatus 100 increases. Therefore, in an information processing apparatus of a type in which a touch sensor panel is bonded to the screen of the display 2, in the case of responding to a user touching the touch sensor panel with vibration, there is a difference in the intensity of vibration responding to the user depending on the touching position on the touch sensor panel.

Figure 12:
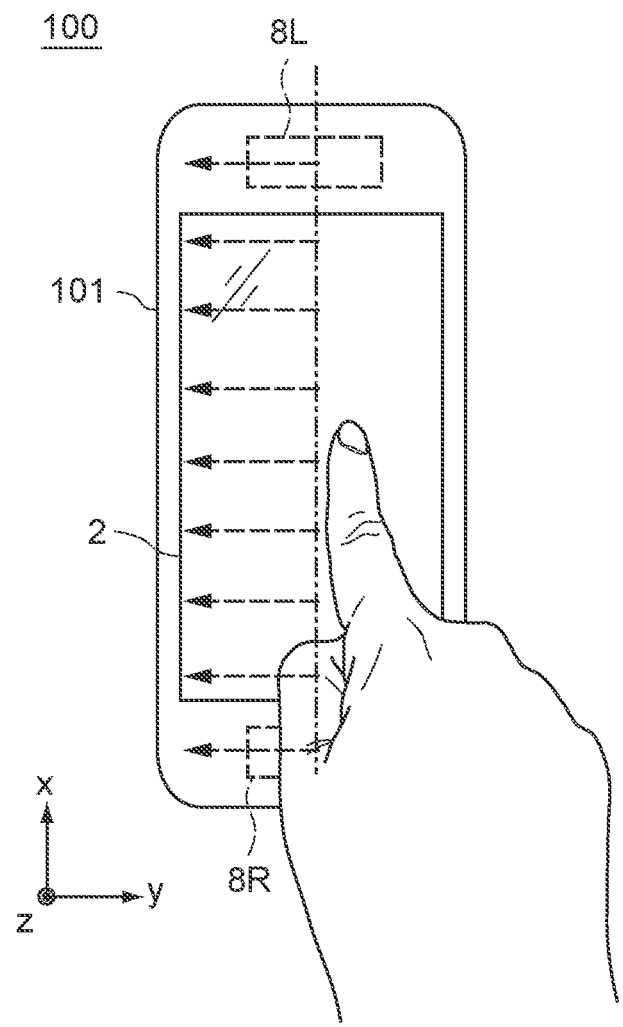
FIG. 12 is a diagram showing the distribution of the magnitude of vibration on a touch sensor panel surface in a case where the L side vibration device and the R side vibration device are vibrated in the same phase.

At the time of an input operation on the touch sensor panel, the arithmetic processing unit 1 of the information processing apparatus 100 according to the present embodiment is configured to vibrate the L side vibration device and the R side vibration device with waveforms having the same phase as shown in FIG. 12. This makes it possible to approximately equalize the intensity of vibration responding to the user depending on the touching position on the touch sensor panel. Therefore, an uncomfortable feeling due to variations in the intensity of response vibration at the time of operating the touch sensor panel is no longer given to the user. Note that, also in this case, the vibration direction of each vibration device may be any of the x direction, the y direction, and the z axis direction.

[Vibration Control of Each Vibration Device Interlocked with Movement of Object being Displayed]

While an image with a movement, such as a moving image, is being displayed on the display 2 of the information processing apparatus 100, the vibrations of the L side vibration device 8L and the R side vibration device 8R may be controlled such that the direction of the movement of an object is felt in the user's hand in accordance with the direction of the movement of the object.

Figure 13:
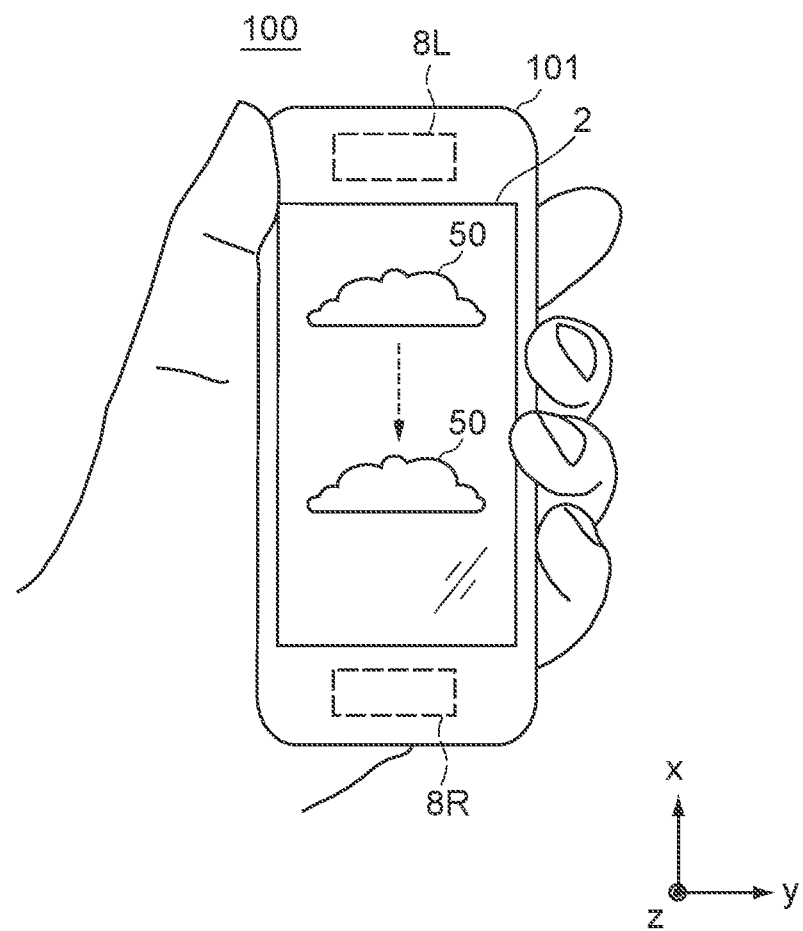
FIG. 13 is a diagram showing how a moving object is displayed on a screen of a display of the information processing apparatus shown in FIG. 1.

For example, as shown in FIG. 13, in a case where an object 50 moves from the top to the bottom on the screen of the display 2, the arithmetic processing unit 1 vibrates the L side vibration device 8L and the R side vibration device 8R with a time difference therebetween in this order with the L side vibration device 8L on the upper side and the R side vibration device 8R on the lower side. Therefore, the user can perceive vibration synchronized with the movement of the object 50 from the top to the bottom.

Figure 14:
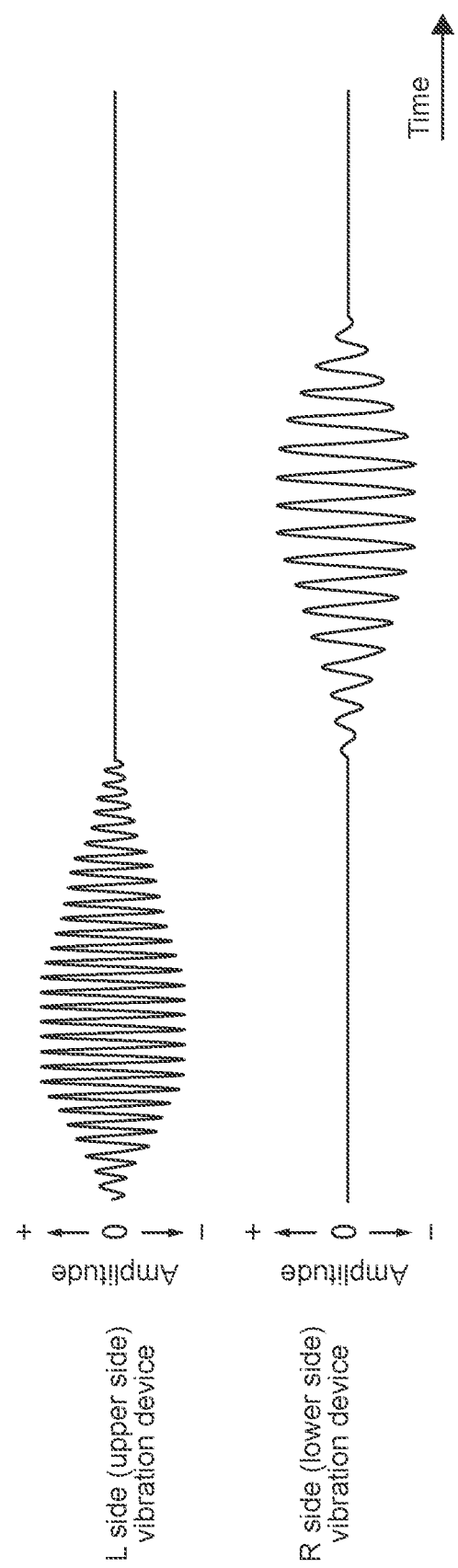
FIG. 14 is a diagram showing examples of an L side vibration waveform and an R side vibration waveform according to the movement of a displayed object.

FIG. 14 is a diagram showing examples of an L side vibration waveform and an R side vibration waveform according to the movement of a displayed object.

By generating vibration by providing the L side vibration device 8L and the R side vibration device 8R with a time difference therebetween in this order as described above and providing a difference between the vibration frequency of the L side vibration device 8L and the vibration frequency of the R side vibration device 8R to the extent that the user can perceive, the user can easily perceive switching from the vibration of the L side vibration device 8L to the vibration of the R side vibration device 8R. Furthermore, a continuous feeling of movement of the object can be expressed by gradually increasing the intensity of the vibration of each of the vibration devices 8L and 8R and gradually decreasing the intensity of the vibration of each of the vibration devices 8L and 8R before the vibration is stopped.

In a case where the object moves from the bottom to the top on the screen of the display 2, the R side vibration device 8R and the L side vibration device 8L may be vibrated with a time difference therebetween in this order.

Figure 15:
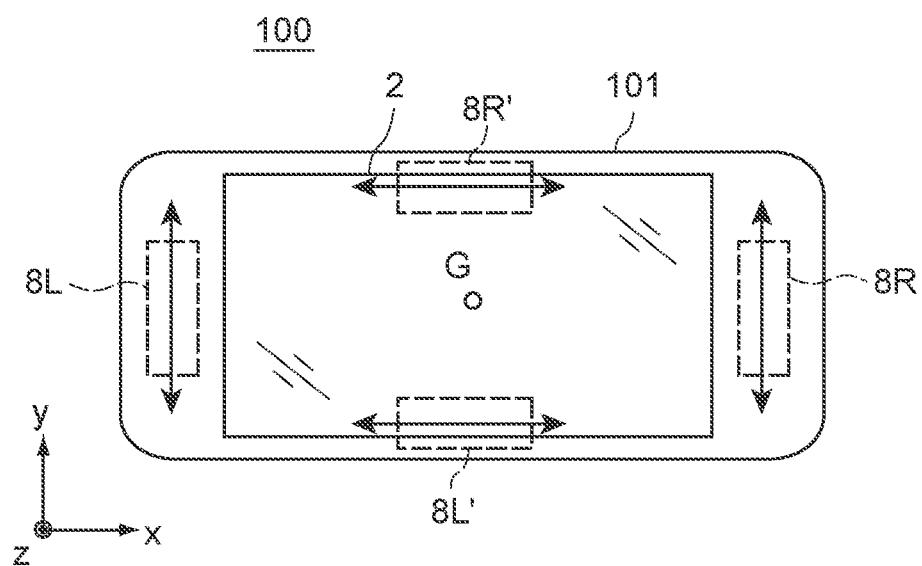
FIG. 15 is a diagram showing an information processing apparatus in which two vibration devices are further added.

Furthermore, as shown in FIG. 15, vibration devices 8R' and 8L' can be added to both end portions of the housing 101 of the information processing apparatus 100 in the y direction, so that the user can perceive vibration synchronized with the right and left movement of the object 50 in a case where the object 50 moves right and left on the screen of the display 2 in FIG. 13. Note that, the vibration direction of each of the vibration devices 8R' and 8L' is the x direction.

Modification Example 1

The stereo vibration technology described above can be applied not only to smartphones but also to game controllers. Further, without being limited to hand-held type information processing apparatuses such as smartphones and game controllers, the stereo vibration technology described above can also be applied to wearable devices that can be mounted on various mounting portions where a haptic feedback can be obtained, such as a wristband type wearable device mounted on the user's wrist, a neck type wearable device, and a head mounted display.

Modification Example 2

Furthermore, in the present technology, processing for stereo vibration by the arithmetic processing unit 1 of the information processing apparatus 100 described above can be performed by a control unit of a cloud server (information processing apparatus) on a network. The arithmetic processing unit 1 of the information processing apparatus 100 described above sends a request to the control unit of the cloud server (information processing apparatus). In response to the request, the control unit of the cloud server (information processing apparatus) generates vibration waveforms of the vibration devices 8L and 8R of the information processing apparatus 100 on the basis of the low frequency component signal of the stereo sound to be output to the information processing apparatus 100, and transmits the vibration waveforms to the information processing apparatus 100 through the network.

Modification Example 3

[Stereo Vibration Belt]

Next, a stereo vibration belt in which the present technology is applied to a belt wrapped around the waist of a user will be described.

Figure 16:
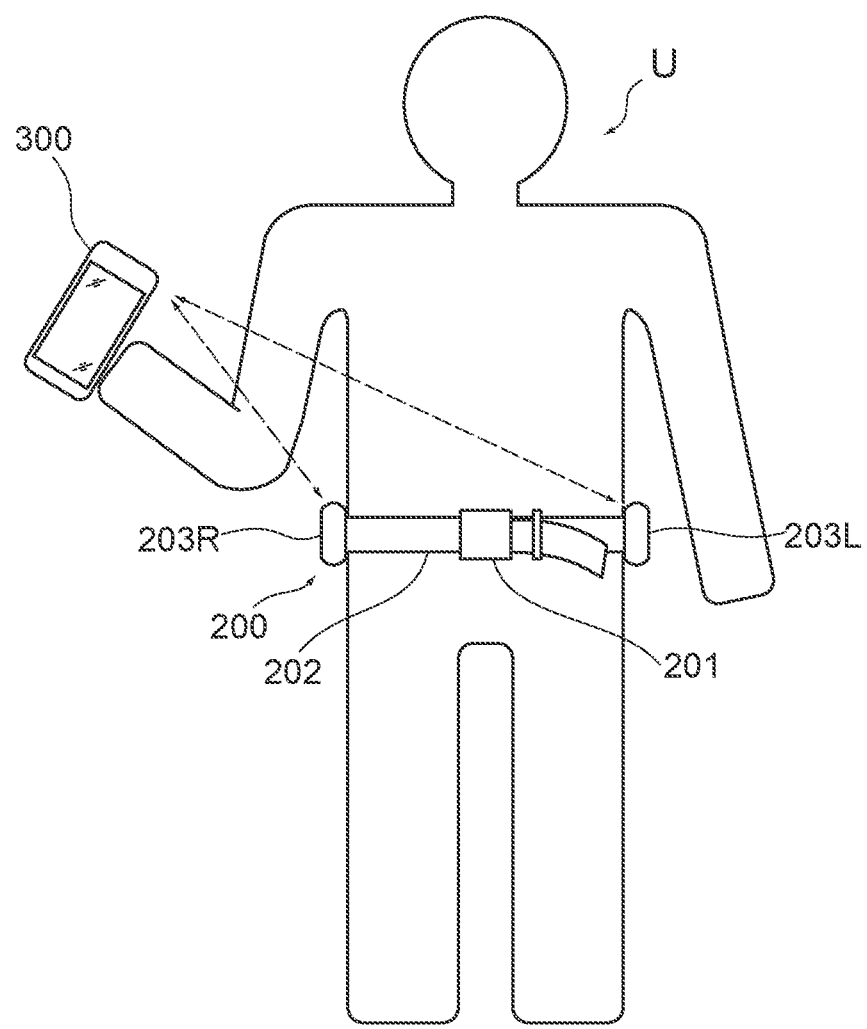
FIG. 16 is a front view showing a mounting state of a stereo vibration belt to which the present technology is applied.
Figure 17:
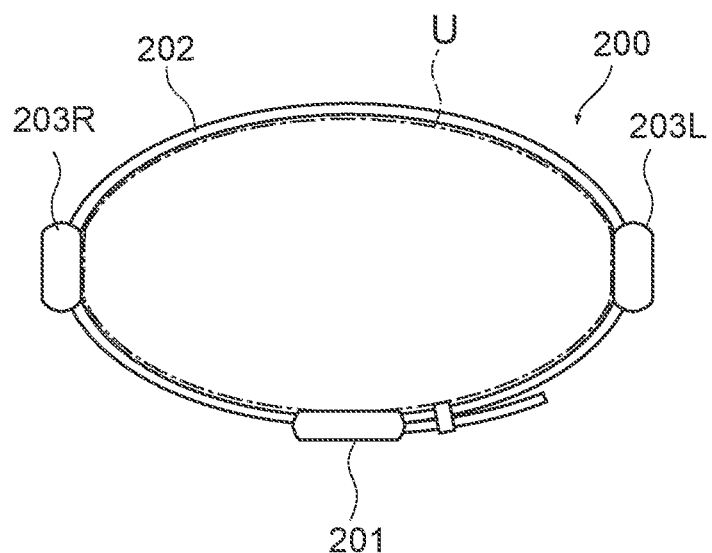
FIG. 17 is a top view of a stereo vibration belt mounted on the waist of a user.
Figure 18:
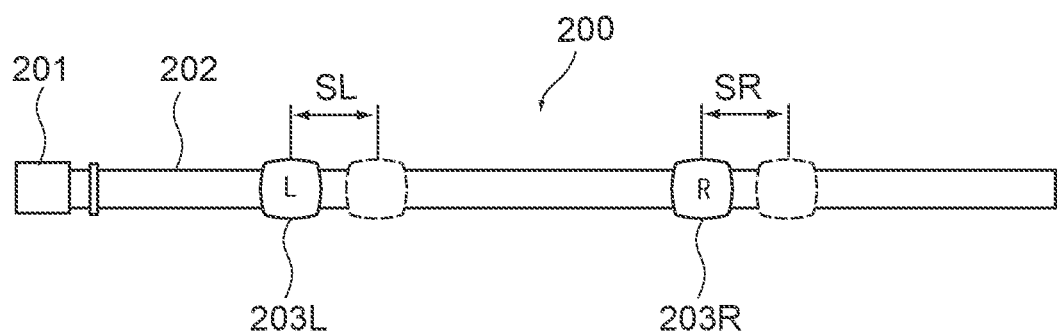
FIG. 18 is a developed view of a stereo vibration belt when the stereo vibration belt is not mounted.

FIG. 16 is a front view showing a state in which a stereo vibration belt 200 is mounted on the waist of a user U. FIG. 17 is a top view of the stereo vibration belt 200 mounted on the waist of the user U. FIG. 18 is a developed view of the stereo vibration belt 200 when the stereo vibration belt 200 is not mounted.

As shown in these diagrams, the stereo vibration belt 200 includes a belt body 202 having one end to which a buckle unit 201 is fixed, an L side vibration device unit 203L in which a vibration device is built, and an R side vibration device unit 203R in which a vibration device is built. Note that, in these diagrams, right and left are right and left seen from the user U. The L side vibration device unit 203L and the R side vibration device unit 203R are disposed so as to be bilaterally symmetrical as seen from the user U when the stereo vibration belt 200 is mounted on the waist of the user U. That is, the L side vibration device unit 203L and the R side vibration device unit 203R are provided on the left side (first side) and the right side (second side) opposite to the left side when the belt 200 is mounted on the user. Note that, a plurality of vibration devices 203L and 203R may be provided on the front side and the back side of the user (typically, the plurality of vibration devices 203L and 203R may be provided at any position as long as the plurality of vibration device units 203L and 203R are provided at opposite positions). In order to cope with an individual difference in the size of the waist of the user U, as shown in FIG. 18, it is desirable that the L side vibration device unit 203L and the R side vibration device unit 203R are slidable in predetermined slide regions SL and SR in the longitudinal direction of the belt body 202 so as to be able to be locked at slide positions determined by the user U. Further, it is desirable that marks indicating right and left are written on the surfaces of the outer cases of the L side vibration device unit 203L and the R side vibration device unit 203R so that the user U does not misunderstand the mounting direction of the stereo vibration belt 200.

A controller 211 is built into the buckle unit 201.

Figure 19:
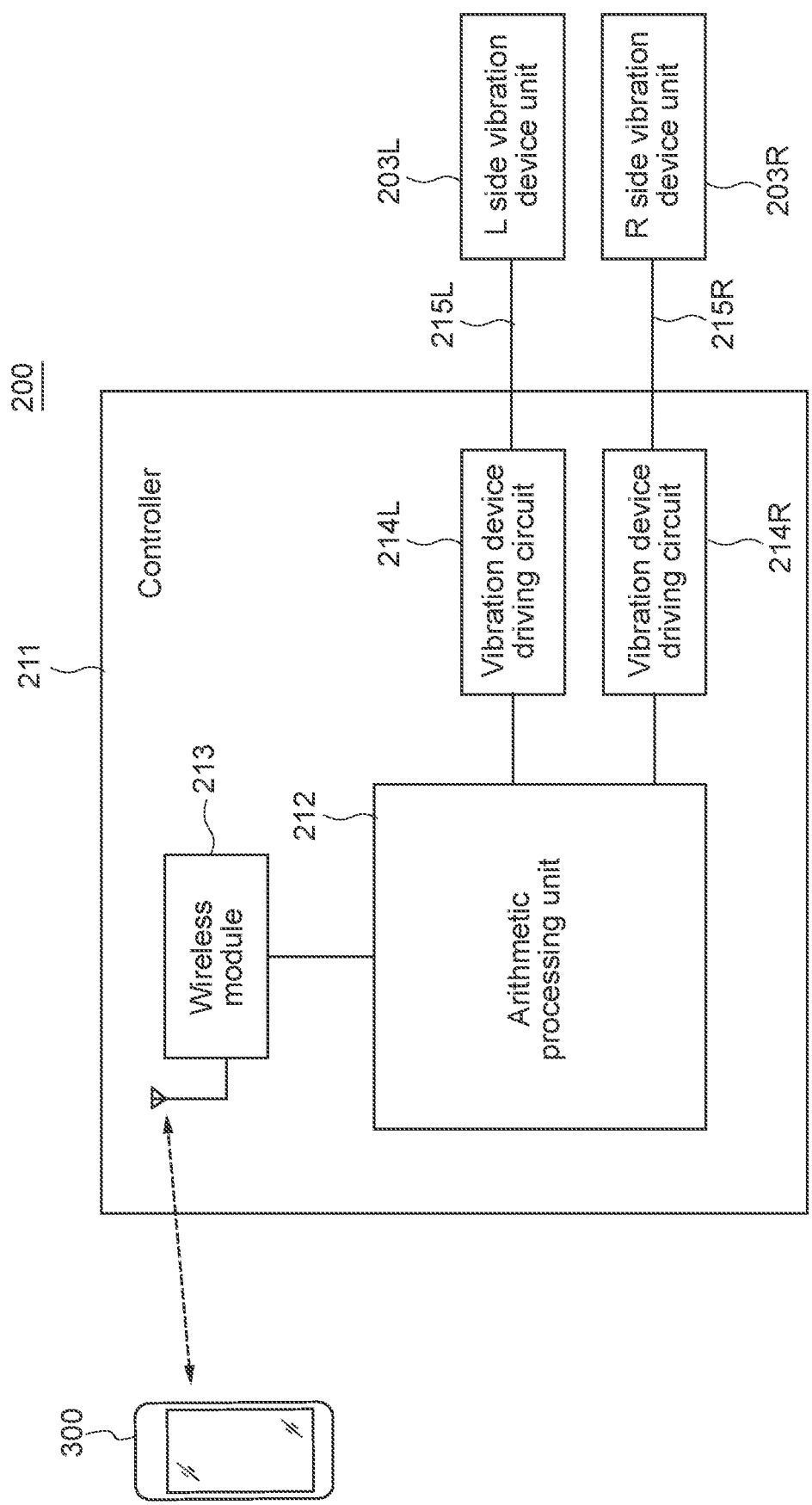
FIG. 19 is a block diagram showing the configuration of a controller in a stereo vibration belt.

FIG. 19 is a block diagram showing the configuration of the controller 211.

The controller 211 has an arithmetic processing unit 212, a wireless module 213, an L-side-vibration-device driving circuit 214L, an R-side-vibration-device driving circuit 214R, a power supply unit (not shown), and the like.

The arithmetic processing unit 212 is configured to include a CPU, a RAM, a ROM, a flash ROM, and the like. The CPU executes arithmetic processing for executing a program loaded into the main memory region of the RAM from the ROM and the flash ROM. Specifically, the CPU controls the wireless module 213, or controls the L-side-vibration-device driving circuit 214L and the R-side-vibration-device driving circuit 214R so that the vibration device in the L side vibration device unit 203L mounted on the belt body 202 and the vibration device in the R side vibration device unit 203R mounted on the belt body 202 vibrate with target vibration waveforms.

The output of the L-side-vibration-device driving circuit 214L is supplied to the L side vibration device unit 203L through a signal wiring line 215L provided in the belt body 202 so that the vibration device in the L side vibration device unit 203L is driven, and the output of the R-side-vibration-device driving circuit 214R is supplied to the R side vibration device unit 203R through a signal wiring line 215R provided in the belt body 202 so that the vibration device in the R side vibration device unit 203R is driven.

The wireless module 213 receives a stereo sound signal wirelessly transmitted from an information processing apparatus 300, such as a portable type mobile apparatus (for example, a smartphone) or a wearable type mobile apparatus. The wireless module 213 is a wireless module for short-range wireless communication, such as Bluetooth (registered trademark), for example. Alternatively, data of the vibration waveforms on the L and R sides generated from the stereo sound signal in the arithmetic processing unit of the information processing apparatus 300 may be transmitted from the information processing apparatus 300 to the controller 211 of the stereo vibration belt 200.

The power supply unit (not shown) is configured by a DC/DC converter or the like that generates electric power necessary for the operation of the stereo vibration belt 200 from charges of a primary battery or a secondary battery, for example.

Next, the operation of the stereo vibration belt 200 will be described.

The information processing apparatus 300 wirelessly transmits stereo sound signals, which are to be output to an L side speaker and an R side speaker, to the controller 211 of the stereo vibration belt 200. In the controller 211 of the stereo vibration belt 200, the arithmetic processing unit 212 extracts a low frequency component signal of, for example, 100 Hz or lower, from the stereo sound signal wirelessly received from the information processing apparatus 300, generates an L side vibration waveform and an R side vibration waveform by normalizing the low frequency component signal so as to have a level or a waveform suitable for driving the vibration device in the L side vibration device unit 203L and the vibration device in the R side vibration device unit 203R, and supplies the L side vibration waveform and the R side vibration waveform to the L-side-vibration-device driving circuit 214L and the R-side-vibration-device driving circuit 214R. Therefore, the vibration device in the L side vibration device unit 203L vibrates in synchronization with the low frequency component signal of the L side sound, and the vibration device in the R side vibration device unit 203R vibrates in synchronization with the low frequency component signal of the R side sound. As a result, the user U can taste the stereo vibration synchronized with the stereo sound throughout the body through the waist.

Next, the vibration direction of the vibration device in the L side vibration device unit 203L mounted on the stereo vibration belt 200 and the vibration device in the R side vibration device unit 203R mounted on the stereo vibration belt 200 will be described.

Figure 20:
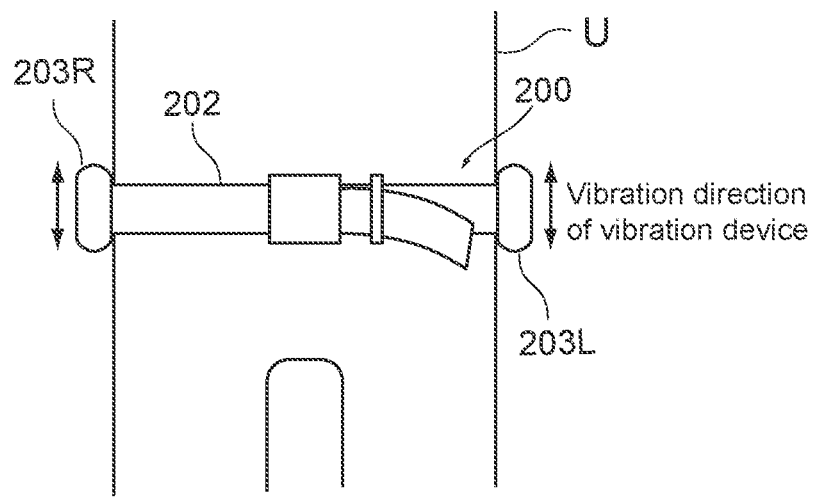
FIG. 20 is a front view showing that right and left vibration devices in a stereo vibration belt are vibrated in a vertical direction.
Figure 21:
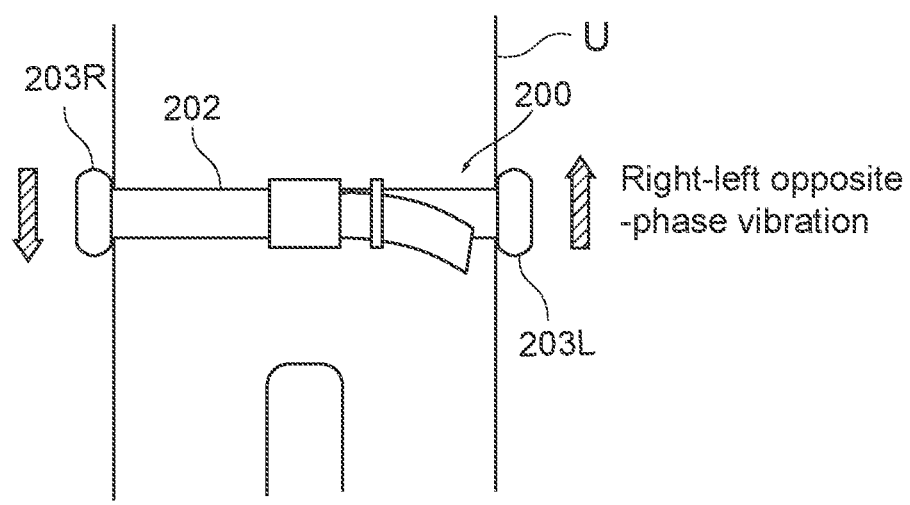
FIG. 21 is a front view showing that the up and down directions of vibrations of the right and left vibration devices in the stereo vibration belt shown in FIG. 20 are opposite to each other.

FIG. 20 shows an example in which the vibration device in the L side vibration device unit 203L and the vibration device in the R side vibration device unit 203R are vibrated in the short side direction of the belt body 202 so that vibration in the vertical direction is given to the user U. In this case, as shown in FIG. 21, the arithmetic processing unit 212 may drive the vibration device in the L side vibration device unit 203L and the vibration device in the R side vibration device unit 203R with vibration waveforms having opposite phases generated from the sound signal obtained by making the stereo sound signal monaural, so that the up and down directions of the vibrations on the L and R sides are opposite to each other. In this manner, it is possible to give the user U a larger sense of vibration.

Figure 22:
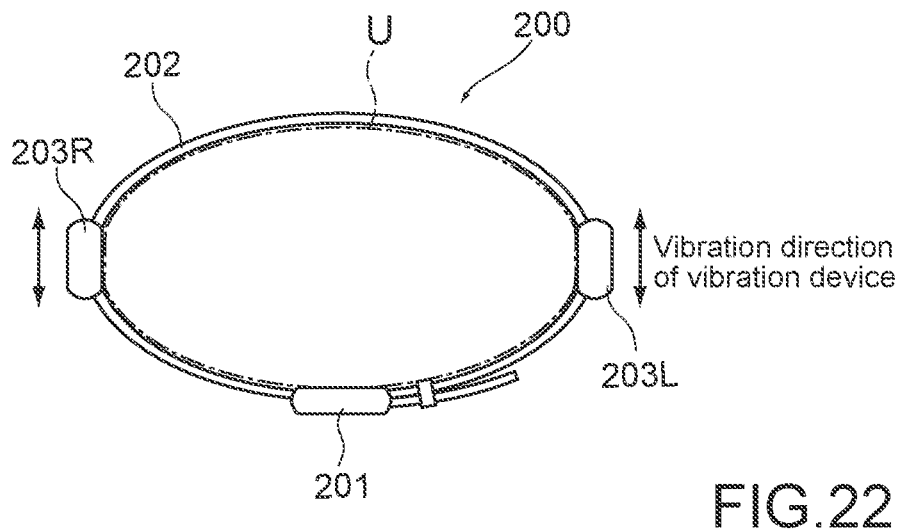
FIG. 22 is a top view showing that right and left vibration devices in a stereo vibration belt are vibrated in a front-back horizontal direction.
Figure 23:
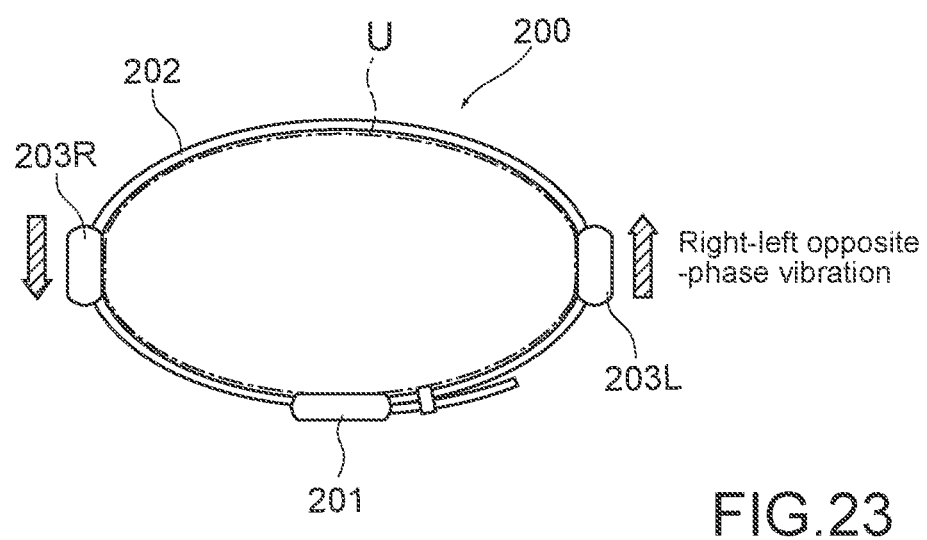
FIG. 23 is a top view showing that the front and back directions of vibrations of the right and left vibration devices in the stereo vibration belt shown in FIG. 22 are opposite to each other.
Figure 24:
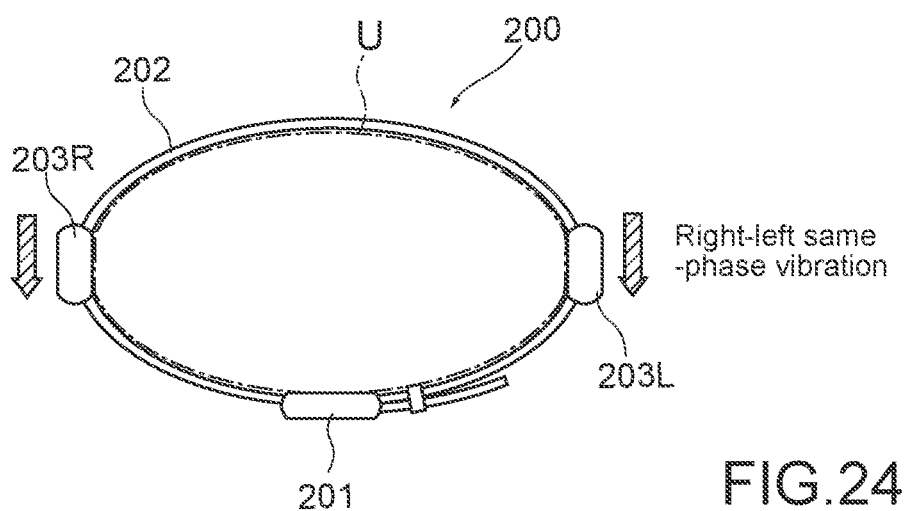
FIG. 24 is a top view showing that the front and back directions of vibrations of the right and left vibration devices in the stereo vibration belt shown in FIG. 22 are the same.

FIG. 22 shows an example in which the vibration device in the L side vibration device unit 203L and the vibration device in the R side vibration device unit 203R are vibrated in the longitudinal direction of the belt body 202 so that vibration in the horizontal direction is given to the user U. Also in this case, as shown in FIG. 23, the arithmetic processing unit 212 may drive the vibration device in the L side vibration device unit 203L and the vibration device in the R side vibration device unit 203R with vibration waveforms having opposite phases generated from the sound signal obtained by making the stereo sound signal monaural, so that the front and back directions of the vibrations are opposite to each other. In this manner, it is possible to give the user U a sense of force in the horizontal rotation direction. Further, as shown in FIG. 24, the arithmetic processing unit 212 may generate vibration waveforms having the same phase from the sound signal obtained by making the stereo sound signal monaural and drive the vibration device in the L side vibration device unit 203L and the vibration device in the R side vibration device unit 203R, so that the front and back directions of the vibrations are the same. In this case, it is possible to mainly give the user U a sense of force in the front-back direction.

Figure 25:
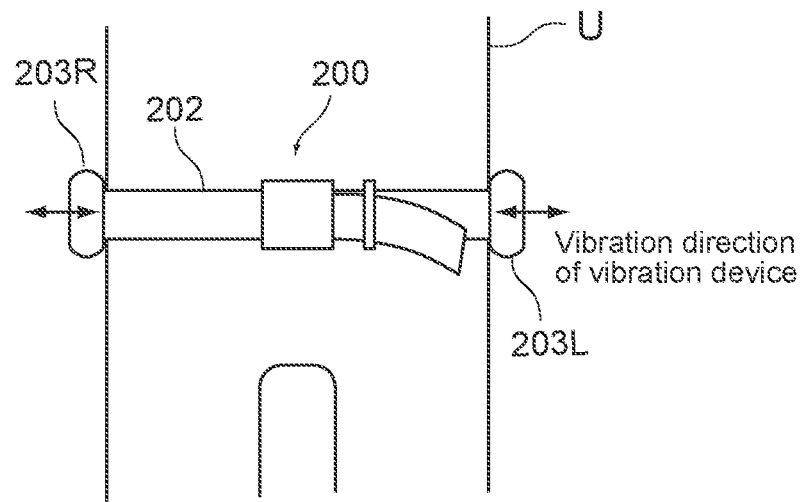
FIG. 25 is a front view showing that right and left vibration devices in a stereo vibration belt are vibrated in a belt body thickness direction.
Figure 26:
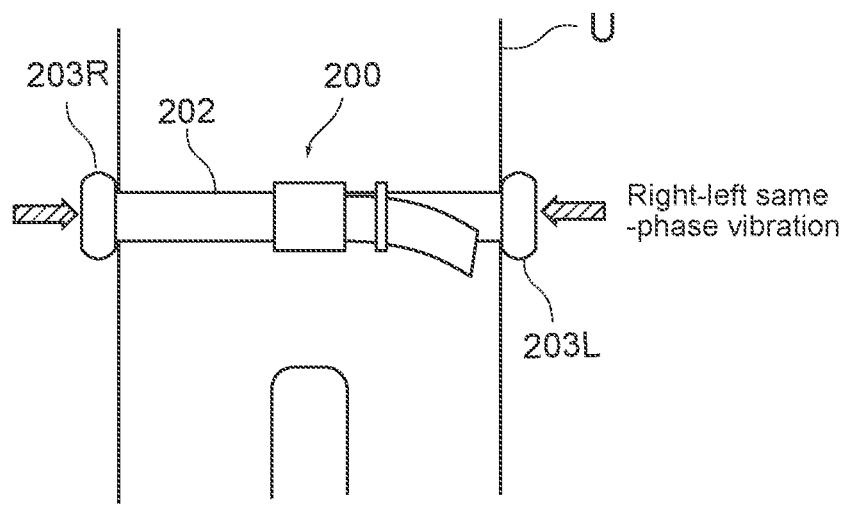
FIG. 26 is a front view showing that directions of vibrations of the right and left vibration devices in the stereo vibration belt shown in FIG. 25 in the belt body thickness direction are the same.

FIG. 25 shows an example in which the vibration device in the L side vibration device unit 203L and the vibration device in the R side vibration device unit 203R are vibrated in the thickness direction of the belt body 202 so that vibration is given to the waist of the user U so as to repeat compression and release. In this case, as shown in FIG. 26, the arithmetic processing unit 212 may drive the vibration device in the L side vibration device unit 203L and the vibration device in the R side vibration device unit 203R with vibration waveforms having the same phase generated from the sound signal obtained by making the stereo sound signal monaural, so that the direction of each vibration in the belt body thickness direction is always the same.

Modification Example 4

[Stereo Vibration Device System]

Figure 27:
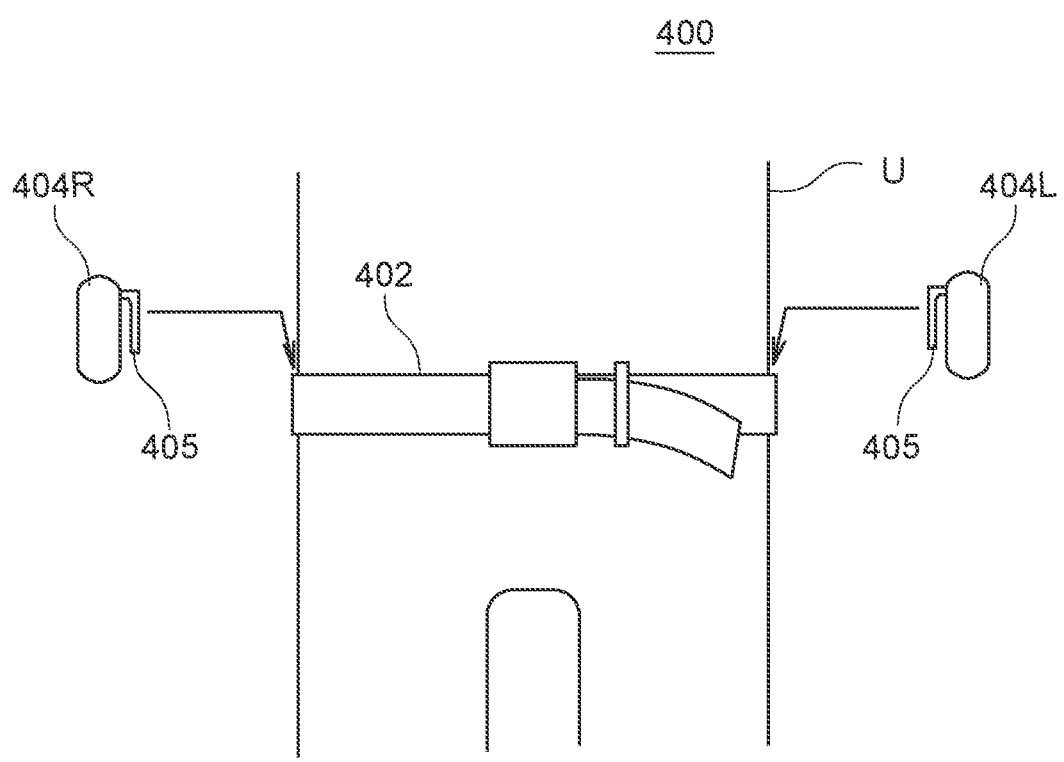
FIG. 27 is a front view showing a stereo vibration device system to which the present technology is applied.

FIG. 27 is a diagram showing a stereo vibration device system 400 including an L side vibration device unit 404L and an R side vibration device unit 404R that can be separately attached to and detached from a general belt 402.

The L side vibration device unit 404L and the R side vibration device unit 404R have mounting portions 405, such as hooks, so that these can be separately mounted on arbitrary positions of the general belt 402.

Figure 28:
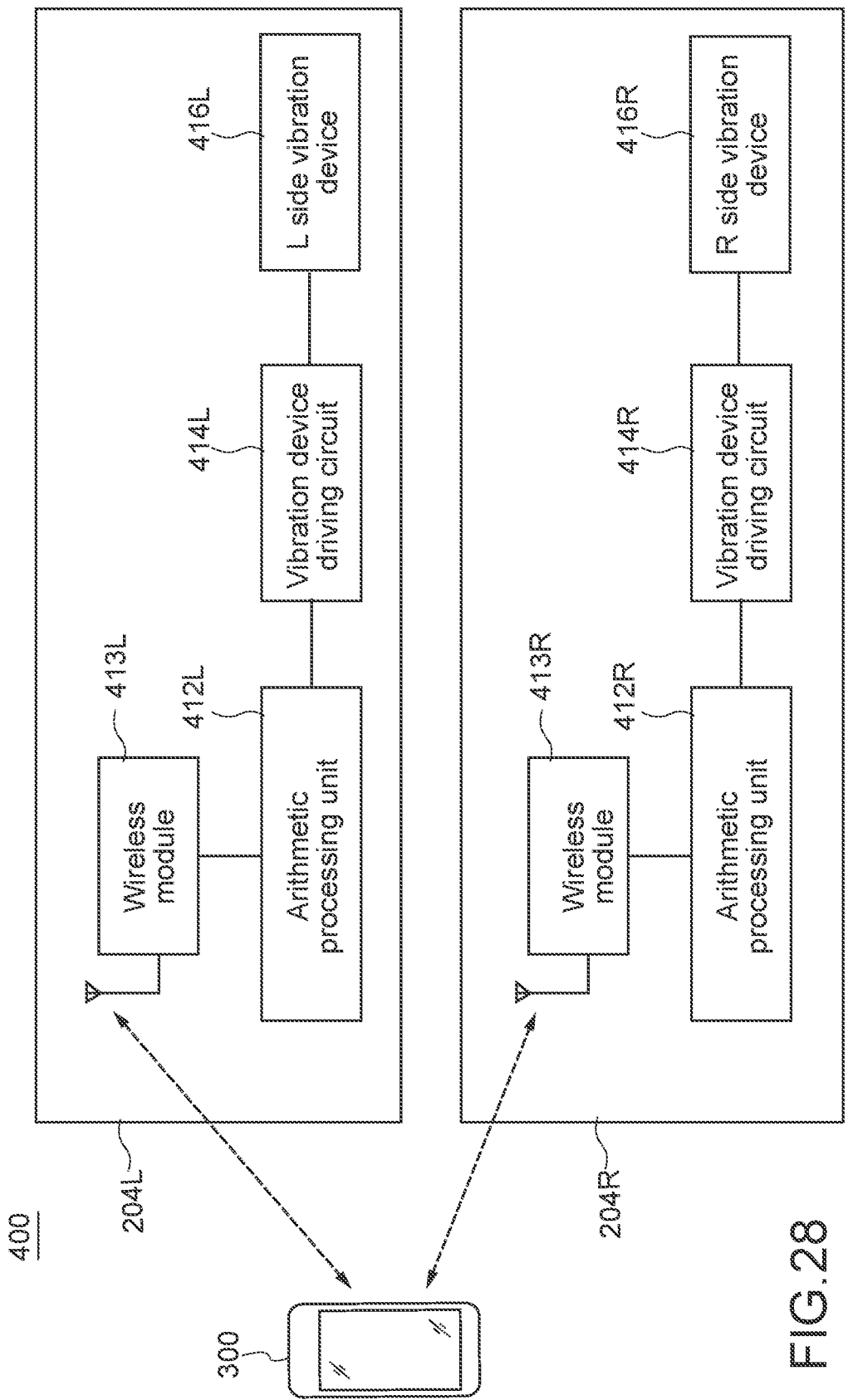
FIG. 28 is a block diagram showing the electrical configuration of the stereo vibration device system.

FIG. 28 is a block diagram showing the electrical configuration of the stereo vibration device system 400.

The L side vibration device unit 404L has an arithmetic processing unit 412L, a wireless module 413L, an L-side-vibration-device driving circuit 414L, an L side vibration device 416L, a power supply unit (not shown), and the like.

The arithmetic processing unit 412L is configured to include a CPU, a RAM, a ROM, a flash ROM, and the like. The CPU executes arithmetic processing for executing a program loaded into the main memory region of the RAM from the ROM and the flash ROM. Specifically, the CPU controls the wireless module 413L, or controls the L-side-vibration-device driving circuit 414L to vibrate the L side vibration device 416L with a target vibration waveform.

The output of the L-side-vibration-device driving circuit 414L is supplied to the L side vibration device 416L in the L side vibration device unit 404L, so that the L side vibration device 416L is driven.

The wireless module 413L receives a stereo sound signal wirelessly transmitted from the information processing apparatus 300, such as a portable type mobile apparatus (for example, a smartphone) or a wearable type mobile apparatus. The wireless module 413L is a wireless module for short-range wireless communication, such as Bluetooth (registered trademark), for example. Alternatively, data of the vibration waveform on the L side generated from the stereo sound signal in the arithmetic processing unit of the information processing apparatus 300 may be transmitted from the information processing apparatus 300 to the L side vibration device unit 404L.

The power supply unit (not shown) is configured by a DC/DC converter or the like that generates electric power necessary for the operation of the L side vibration device unit 404L from charges of a primary battery or a secondary battery, for example.

Similarly to the L side vibration device unit 404L, the R side vibration device unit 404R has an arithmetic processing unit 412R, a wireless module 413R, an R-side-vibration-device driving circuit 414R, an R side vibration device 416R, a power supply unit (not shown), and the like.

The arithmetic processing unit 412R is configured to include a CPU, a RAM, a ROM, a flash ROM, and the like. The CPU executes arithmetic processing for executing a program loaded into the main memory region of the RAM from the ROM and the flash ROM. Specifically, the CPU controls the wireless module 413R, or controls the R-side-vibration-device driving circuit 414R to vibrate the R side vibration device 416R with a target vibration waveform.

The output of the R-side-vibration-device driving circuit 414R is supplied to the R side vibration device 416R in the R side vibration device unit 404R, so that the R side vibration device 416R is driven.

The wireless module 413R receives a stereo sound signal wirelessly transmitted from the information processing apparatus 300, such as a portable type mobile apparatus (for example, a smartphone) or a wearable type mobile apparatus. The wireless module 413R is a wireless module for short-range wireless communication, such as Bluetooth (registered trademark), for example. Alternatively, data of the vibration waveform on the R side generated from the stereo sound signal in the arithmetic processing unit of the information processing apparatus 300 may be transmitted from the information processing apparatus 300 to the R side vibration device unit 404R.

The power supply unit (not shown) is configured by a DC/DC converter or the like that generates electric power necessary for the operation of the R side vibration device unit 404R from charges of a primary battery or a secondary battery, for example.

In the stereo vibration device system 400, the sound signal to be output to the L side speaker of the information processing apparatus 300 is wirelessly transmitted to the L side vibration device unit 404L, and the sound signal to be output to the R side speaker of the information processing apparatus 300 is wirelessly transmitted to the R side vibration device unit 404R.

In the L side vibration device unit 404L, the arithmetic processing unit 412L extracts a low frequency component signal of, for example, 100 Hz or lower, from the L side sound signal wirelessly received from the information processing apparatus 300, generates an L side vibration waveform by normalizing the low frequency component signal so as to have a level or a waveform suitable for driving the vibration device 416L, and supplies the L side vibration waveform to the L-side-vibration-device driving circuit 414L. As a result, the L side vibration device 416L vibrates in synchronization with the low frequency component signal of the L side sound.

On the other hand, also in the R side vibration device unit 404R, the arithmetic processing unit 412R extracts a low frequency component signal of, for example, 100 Hz or lower, from the R side sound signal wirelessly received from the information processing apparatus 300, generates an R side vibration waveform by normalizing the low frequency component signal so as to have a level or a waveform suitable for driving the vibration device 416R, and supplies the R side vibration waveform to the R-side-vibration-device driving circuit 414R. Therefore, the R side vibration device 416R vibrates in synchronization with the low frequency component signal of the R side sound.

As a result, similarly to the stereo vibration belt 200 described above, the user U can taste the stereo vibration by the L side vibration device unit 404L and the R side vibration device unit 404R throughout the body through the waist.

Further, according to the stereo vibration device system 400, the positions of the L side vibration device unit 404L and the R side vibration device unit 404R can be freely selected.

In order to taste a clear stereo feeling, it is important for the L side vibration device unit 404L and the R side vibration device unit 404R to be correctly mounted at the bilaterally symmetrical positions of the waist of the user U with the relationship of right and left. In the stereo vibration device system 400, since the L side vibration device unit 404L and the R side vibration device unit 404R are separately provided, there is a possibility that the L side vibration device unit 404L and the R side vibration device unit 404R will be reversely mounted on a belt 202a. In order to prevent such a mounting error, it is desirable that marks or the like indicating right and left are written on the outer cases of the L side vibration device unit 404L and the R side vibration device unit 404R by printing or the like.

Modification Example 5

In the Modification Example 3 described above, as shown in FIG. 18, the L side vibration device unit 203L and the R side vibration device unit 203R are configured to be slidable in predetermined slide regions ST and SR in the longitudinal direction of the belt body 202, so that it is possible to cope with a difference in waist size between users. However, in the case of such a configuration, it is necessary to adjust the positions of the vibration device unit 203L and the R side vibration device unit 203R for each user. This is troublesome in a case where a plurality of users share the stereo vibration belt 200.

Figure 29:
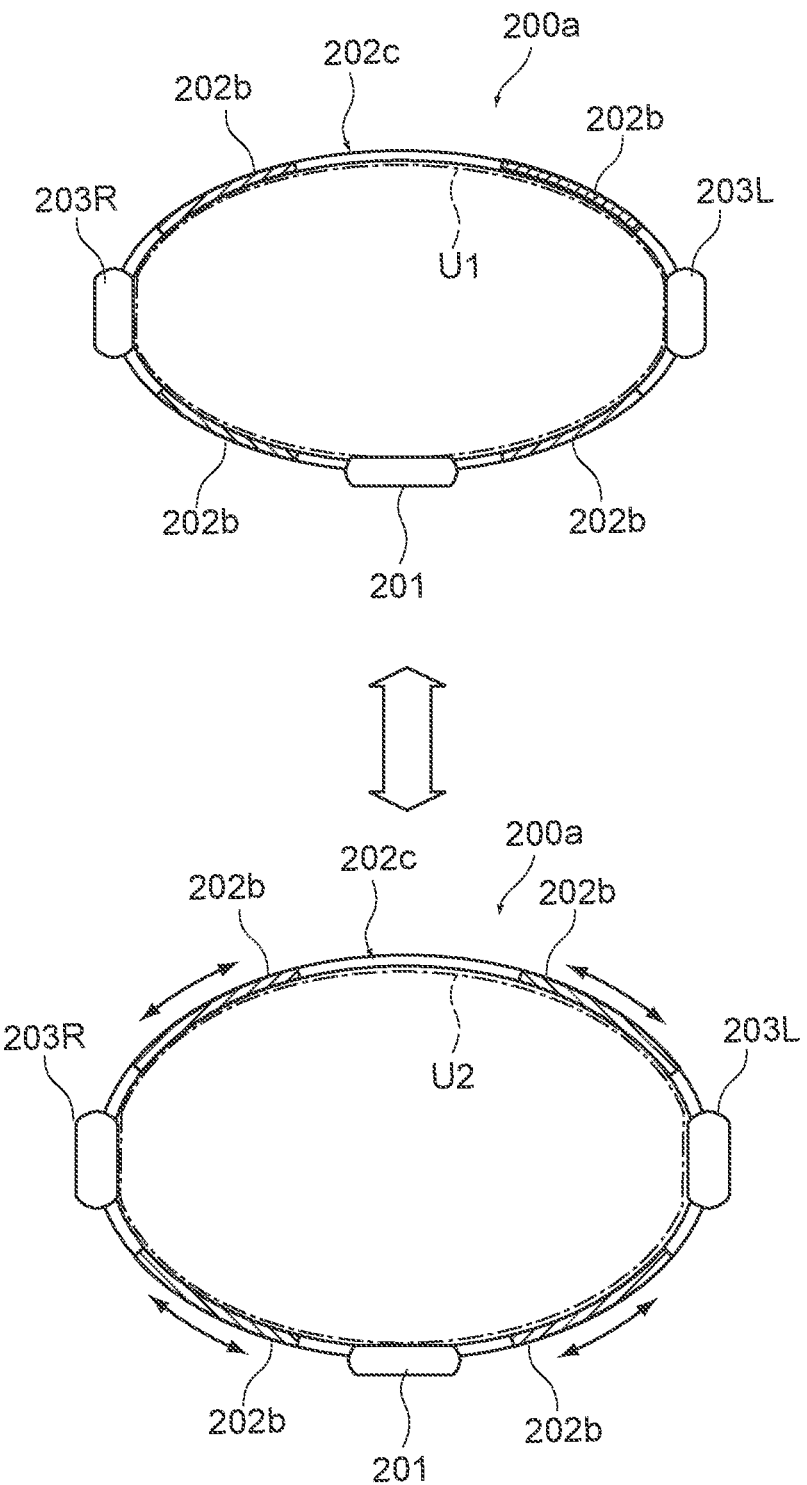
FIG. 29 is a top view showing a modification example of the stereo vibration belt.

FIG. 29 is a diagram showing a stereo vibration belt 200a for which adjustment of the positions of the L side vibration device unit 203L and the R side vibration device unit 203R for each user can be omitted.

In the stereo vibration belt 200a, a belt body 202c is used in which expandable portions 202b, which can expand and contract in the longitudinal direction, are symmetrically provided in the front and rear and the right and left. In the stereo vibration belt 200a, since the L side half and the R side half of the belt body 202c wrapped around the waist of each of users U1 and U2 uniformly expand in the longitudinal direction due to the expandable portions 202b, the bilaterally symmetrical positional relationship between the L side vibration device unit 203L and the R side vibration device unit 203 is not disturbed by the difference in the size of the circumference of the waist between the users U1 and U2. Therefore, in a case where the stereo vibration belt 200a is shared by the plurality of users U1 and U2, it is not necessary to adjust the positions the L side vibration device unit 203L and the R side vibration device unit 203. Note that, the entire belt body 202c may be configured by the expandable portions 202b.

Figure 30:
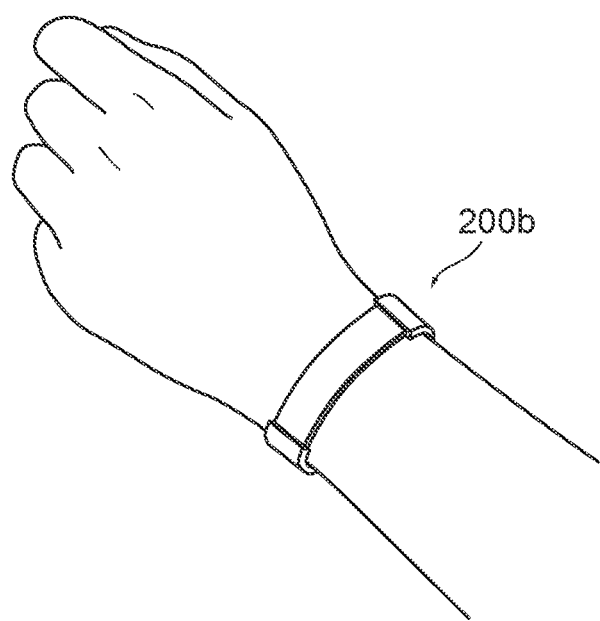
FIG. 30 is a perspective view showing a stereo vibration belt that can be mounted on the hand of a user.

Note that, although the stereo vibration belt that can be wrapped around the waist of the user has been described so far, a stereo vibration belt 200b wrapped around the wrist of the user as shown in FIG. 30 can be used. Furthermore, a stereo vibration belt that can be wrapped around the neck, ankle, or the like of the user can be used.

Note that, without being limited to the belt-type wearable device wrapped around the body of the user, the vibration device units 203L and 203R may be provided in wearable devices other than the belt type. For example, the vibration device units 203L and 203R may be provided in various wearable devices, such as a head mounted display and a glasses type wearable device.

Various Modification Examples

In the above description, the speakers 6L and 6R have been described as examples of the sound output device. On the other hand, the sound output device may be a headphone (including an earphone). Further, the sound output device is not limited to a sound output device corresponding to a sound signal of two channels (that is, a stereo signal), and may be a sound output device corresponding to a sound signal of three or more channels (for example, a multi-channel speaker of three or more channels).

Further, in the above description, a case where the sound signal as a basis for vibrating the haptic-feedback presentation devices (the vibration devices 8L and 8R or the vibration device units 203L and 203R) is a stereo signal (that is, two channels) has been described. On the other hand, the sound signal may be a sound signal of three or more channels. Further, although a case where the number of sound output devices is two has been described above, the number of sound output devices may be three or more (for example, a case where sound signals are three or more channels).

Further, in the above description, as examples of the haptic-feedback presentation device that presents a haptic feedback to the user, the vibration devices 8L and 8R and the vibration device units 203L and 203R have been taken as examples. On the other hand, the haptic-feedback presentation device may be a device that presents a haptic feedback to the user by pressure. Further, although a case where the number of haptic-feedback presentation devices is two has been described above, the number of haptic-feedback presentation devices may be three or more (for example, a case where sound signals are three or more channels).

Further, in the above description, a case where the haptic-feedback presentation signal supplied to the haptic-feedback presentation device is a signal having a vibration waveform has been described above. On the other hand, in a case where the haptic-feedback presentation device is a device that presents a haptic feedback to the user, for example, by pressure, the haptic-feedback presentation signal may be a signal having a waveform of pressure.

In the above description, the case has been described in which low frequency components (the first characteristic information and the second characteristic information) belonging to a frequency band of a predetermined frequency or lower are extracted from the sound signal and haptic-feedback presentation signals (the first haptic-feedback presentation signal and the second haptic-feedback presentation signal) are generated on the basis of the low frequency components. On the other hand, high frequency components (the first characteristic information and the second characteristic information) belonging to a frequency band of a predetermined frequency or higher may be extracted from the sound signal, and haptic-feedback presentation signals (the first haptic-feedback presentation signal and the second haptic-feedback presentation signal) may be generated on the basis of the high frequency components (note that, this also applies to the third characteristic information in the monaural sound signal described above). In this case, for example, the high frequency components are components in a frequency band that are difficult to perceive as sound through the eardrum by the user.

Furthermore, the present technology can also adopt the following configuration.

(1) An information processing apparatus including: an arithmetic processing unit that generates a first haptic-feedback presentation signal, which is to be supplied to a first haptic-feedback presentation device of a plurality of haptic-feedback presentation devices, on the basis of first characteristic information extracted from a first sound signal corresponding to a first channel among sounds of a plurality of channels output from a sound output device capable of outputting the sounds of the plurality of channels and generates a second haptic-feedback presentation signal, which is to be supplied to a second haptic-feedback presentation device of the plurality of haptic-feedback presentation devices, on the basis of second characteristic information extracted from a second sound signal corresponding to a second channel among the sounds of the plurality of channels.

(2) The information processing apparatus described in the above (1), in which the arithmetic processing unit extracts a first low frequency component signal belonging to a frequency band of a predetermined frequency or lower from the first sound signal as the first characteristic information.

(3) The information processing apparatus described in the above (2), in which the arithmetic processing unit extracts a second low frequency component signal belonging to a frequency band of a predetermined frequency or lower from the second sound signal as the second characteristic information.

(4) The information processing apparatus described in the above (3), in which the first haptic-feedback presentation device and the second haptic-feedback presentation device are disposed at distant positions, and the arithmetic processing unit generates, as the first haptic-feedback presentation signal, a signal obtained by adding a first opposite phase signal, which is a signal having an opposite phase to the second low frequency component signal and corresponds to an amplitude of vibration output from the second haptic-feedback presentation device on the basis of the second low frequency component signal, to the first low frequency component signal, the amplitude of the vibration being attenuated along with transmission to the first haptic-feedback presentation device.

(5) The information processing apparatus described in the above (3) or (4), in which the first haptic-feedback presentation device and the second haptic-feedback presentation device are disposed at distant positions, and the arithmetic processing unit generates, as the second haptic-feedback presentation signal, a signal obtained by adding a second opposite phase signal, which is a signal having an opposite phase to the first low frequency component signal and corresponds to an amplitude of vibration output from the first haptic-feedback presentation device on the basis of the first low frequency component signal, to the second low frequency component signal, the amplitude of the vibration being attenuated along with transmission to the second haptic-feedback presentation device.

(6) The information processing apparatus described in any one of the above (1) to (5), in which the plurality of haptic-feedback presentation devices are provided in a housing, and the arithmetic processing unit determines whether a direction in a positional relationship between the plurality of haptic-feedback presentation devices depending on a direction of a posture of the housing is close to either a direction of gravity or a horizontal direction, and generates the first haptic-feedback presentation signal on the basis of the first characteristic information and generates the second haptic-feedback presentation signal on the basis of the second characteristic information in a case where it is determined that the direction in the positional relationship is close to the horizontal direction.

(7) The information processing apparatus described in the above (6), in which, in a case where it is determined that the direction in the positional relationship is close to the direction of gravity, the arithmetic processing unit generates a monaural sound signal from sound signals of the plurality of channels and generates the first haptic-feedback presentation signal and the second haptic-feedback presentation signal on the basis of the monaural sound signal.

(8) The information processing apparatus described in the above (7), in which the arithmetic processing unit extracts third characteristic information from the monaural sound signal and generates the first haptic-feedback presentation signal and the second haptic-feedback presentation signal on the basis of the third characteristic information.

(9) The information processing apparatus described in the above (8), in which the arithmetic processing unit extracts a third low frequency component signal belonging to a frequency band of a predetermined frequency or lower from the monaural sound signal as the third characteristic information.

(10) The information processing apparatus described in the above (9), in which the arithmetic processing unit generates the third low frequency component signal as the first haptic-feedback presentation signal and generates a signal having an opposite phase to the third low frequency component signal as the second haptic-feedback presentation signal.

(11) The information processing apparatus described in any one of the above (1) to (10), in which the plurality of haptic-feedback presentation devices are provided in first and second end portions in a housing including a display device, the first and second end portions being both end portions in one coordinate axis direction of the display device.

(12) The information processing apparatus described in any one of the above (1) to (10), in which the plurality of haptic-feedback presentation devices are provided in a wearable device.

(13) The information processing apparatus described in the above (12), in which the plurality of haptic-feedback presentation devices are provided in a belt-type wearable device.

(14) The information processing apparatus described in the above (13), in which the plurality of haptic-feedback presentation devices are provided on a first side and a second side opposite to the first side when the belt is mounted on a body of a user.

(15) An information processing method including: generating, by an arithmetic processing unit, a first haptic-feedback presentation signal, which is to be supplied to a first haptic-feedback presentation device of a plurality of haptic-feedback presentation devices, on the basis of first characteristic information extracted from a first sound signal corresponding to a first channel, among sounds of a plurality of channels output from a sound output device capable of outputting the sounds of the plurality of channels; and generating, by an arithmetic processing unit, a second haptic-feedback presentation signal, which is to be supplied to a second haptic-feedback presentation device of the plurality of haptic-feedback presentation devices, on the basis of second characteristic information extracted from a second sound signal corresponding to a second channel, among the sounds of the plurality of channels.

(16) A program causing a computer to function as: an arithmetic processing unit that generates a first haptic-feedback presentation signal, which is to be supplied to a first haptic-feedback presentation device of a plurality of haptic-feedback presentation devices, on the basis of first characteristic information extracted from a first sound signal corresponding to a first channel among sounds of a plurality of channels output from a sound output device capable of outputting the sounds of the plurality of channels and generates a second haptic-feedback presentation signal, which is to be supplied to a second haptic-feedback presentation device of the plurality of haptic-feedback presentation devices, on the basis of second characteristic information extracted from a second sound signal corresponding to a second channel among the sounds of the plurality of channels.

(17) An information processing apparatus including: a control unit that receives a request from an information processing terminal through a network, generates a first haptic-feedback presentation signal, which is to be supplied to a first haptic-feedback presentation device of a plurality of haptic-feedback presentation devices, on the basis of first characteristic information extracted from a first sound signal corresponding to a first channel among sounds of a plurality of channels output from a sound output device capable of outputting the sounds of the plurality of channels, generates a second haptic-feedback presentation signal, which is to be supplied to a second haptic-feedback presentation device of the plurality of haptic-feedback presentation devices, on the basis of second characteristic information extracted from a second sound signal corresponding to a second channel among the sounds of the plurality of channels, and transmits information of the first haptic-feedback presentation signal and the second haptic-feedback presentation signal to the information processing terminal through the network.

In addition, it is needless to say that the present technology is not limited only to the embodiments described above and various modifications can be made without departing from the gist of the present technology.

REFERENCE SIGNS LIST 1 arithmetic processing unit
2 display
3 acceleration sensor
4 gyro sensor
5.L sound output amplifier
5 sound output amplifier
6L L side speaker
6R R side speaker
7L L-side-vibration-device driving circuit
7R R-side-vibration-device driving circuit
8L L side vibration device
8R R side vibration device
100 information processing apparatus
101 housing

The invention claimed is:

1. An information processing apparatus, comprising:
a housing that includes a display screen;
a plurality of haptic-feedback presentation devices in the housing, wherein
the plurality of haptic-feedback presentation devices includes a first haptic-feedback presentation device and a second haptic-feedback presentation device,
the first haptic-feedback presentation device is in a first end portion of the housing in one coordinate axis direction of the display screen, and
the second haptic-feedback presentation device is in a second end portion of the housing in the one coordinate axis direction of the display screen;
a sound output device configured to output a plurality of sounds of a plurality of channels; and
an arithmetic processing unit configured to:
determine a direction in a positional relationship between the plurality of haptic-feedback presentation devices is close to one of a direction of gravity or a horizontal direction,
wherein the direction in the positional relationship is based on a direction of a posture of the housing;
generate, in a case where the direction in the positional relationship is close to the horizontal direction, a first haptic-feedback presentation signal based on first characteristic information extracted from a first sound signal that corresponds to a first channel among the plurality of sounds of the plurality of channels,
wherein the generated first haptic-feedback presentation signal is sent to the first haptic-feedback presentation device;
generate, in the case where the direction in the positional relationship is close to the horizontal direction, a second haptic-feedback presentation signal based on second characteristic information extracted from a second sound signal that corresponds to a second channel among the plurality of sounds of the plurality of channels, wherein
the generated second haptic-feedback presentation signal is sent to the second haptic-feedback presentation device of the plurality of haptic-feedback presentation devices,
the generated first haptic-feedback presentation signal has a time difference with respect to the generated second haptic-feedback presentation signal, and
the time difference is based on a direction of movement of an object displayed on the display screen between the first end portion and the second end portion;
generate, in a case where the direction in the positional relationship is close to the direction of gravity, a monaural sound signal from a plurality of sound signals of the plurality of channels;
extract, as third characteristic information, a first low frequency component signal that belongs to a frequency band of a determined frequency or lower from the monaural sound signal;
generate the first low frequency component signal as the first haptic-feedback presentation signal; and
generate a signal having an opposite phase to the first low frequency component signal as the second haptic-feedback presentation signal.

2. The information processing apparatus according to claim 1, wherein the arithmetic processing unit is further configured to extract a second low frequency component signal that belongs to the frequency band of the determined frequency or lower from the first sound signal as the first characteristic information.

3. The information processing apparatus according to claim 2, wherein the arithmetic processing unit is further configured to extract a third low frequency component signal that belongs to the frequency band of the determined frequency or lower from the second sound signal as the second characteristic information.

4. The information processing apparatus according to claim 3, wherein the first haptic-feedback presentation device and the second haptic-feedback presentation device are at distant positions, the arithmetic processing unit is further configured to add a first opposite phase signal to the second low frequency component signal to generate the first haptic-feedback presentation signal, the first opposite phase signal has an opposite phase to the third low frequency component signal, and corresponds to an amplitude of vibration output from the second haptic-feedback presentation device, and the amplitude of the vibration output from the second haptic-feedback presentation device is attenuated along with transmission of the first haptic-feedback presentation signal to the first haptic-feedback presentation device.

5. The information processing apparatus according to claim 3, wherein the first haptic-feedback presentation device and the second haptic-feedback presentation device are at distant positions, the arithmetic processing unit is further configured to add a second opposite phase signal to the third low frequency component signal to generate the second haptic-feedback presentation signal, the second opposite phase signal has an opposite phase to the second low frequency component signal, and corresponds to an amplitude of vibration output from the first haptic-feedback presentation device, and the amplitude of the vibration output from the first haptic-feedback presentation device is attenuated along with transmission of the second haptic-feedback presentation signal to the second haptic-feedback presentation device.

6. The information processing apparatus according to claim 1, wherein the plurality of haptic-feedback presentation devices is in a wearable device.

7. The information processing apparatus according to claim 6, wherein the plurality of haptic-feedback presentation devices is in a belt-type wearable device.

8. The information processing apparatus according to claim 7, wherein the plurality of haptic-feedback presentation devices is on a first side and a second side opposite to the first side in case where the belt-type wearable device is mounted on a body of a user.

9. An information processing method, comprising:
outputting, by a sound output device, a plurality of sounds of a plurality of channels;
determining, by an arithmetic processing unit, a direction in a positional relationship between a plurality of haptic-feedback presentation devices is close to one of a direction of gravity or a horizontal direction,
  wherein the direction in the positional relationship is based on a direction of a posture of a housing;
generating, by the arithmetic processing unit in a case where the direction in the positional relationship is close to the horizontal direction, a first haptic-feedback presentation signal based on first characteristic information extracted from a first sound signal that corresponds to a first channel among the plurality of sounds of the plurality of channels, wherein
  the first haptic-feedback presentation signal is sent to a first haptic-feedback presentation device of the plurality of haptic-feedback presentation devices;
generating, by the arithmetic processing unit in the case where the direction in the positional relationship is close to the horizontal direction, a second haptic-feedback presentation signal based on second characteristic information extracted from a second sound signal that corresponds to a second channel among the plurality of sounds of the plurality of channels, wherein
  the second haptic-feedback presentation signal is sent to a second haptic-feedback presentation device of the plurality of haptic-feedback presentation devices,
  the first haptic-feedback presentation device is in a first end portion of the housing of a display screen and the second haptic-feedback presentation device is in a second end portion of the housing,
  the first end portion and the second end portion are in one coordinate axis direction of the display screen,
  the generated first haptic-feedback presentation signal has a time difference with respect to the generated second haptic-feedback presentation signal, and
  the time difference is based on a direction of movement of an object displayed on the display screen between the first end portion and the second end portion;
generating, in a case where the direction in the positional relationship is close to the direction of gravity, a monaural sound signal from a plurality of sound signals of the plurality of channels;
extracting, as third characteristic information, a low frequency component signal that belongs to a frequency band of a determined frequency or lower from the monaural sound signal;
generating the low frequency component signal as the first haptic-feedback presentation signal; and
generating a signal having an opposite phase to the low frequency component signal as the second haptic-feedback presentation signal.

10. A non-transitory computer-readable medium having stored thereon computer-executable instructions which, when executed by a processor, cause the processor to execute operations, the operations comprising:
outputting, by a sound output device, a plurality of sounds of a plurality of channels;
determining a direction in a positional relationship between a plurality of haptic-feedback presentation devices is close to one of a direction of gravity or a horizontal direction,
  wherein the direction in the positional relationship is based on a direction of a posture of a housing;
generating, in a case where the direction in the positional relationship is close to the horizontal direction, a first haptic-feedback presentation signal based on first characteristic information extracted from a first sound signal that corresponds to a first channel among the plurality of sounds of the plurality of channels, wherein
  the first haptic-feedback presentation signal is sent to a first haptic-feedback presentation device of the plurality of haptic-feedback presentation devices;
generating, in the case where the direction in the positional relationship is close to the horizontal direction, a second haptic-feedback presentation signal based on second characteristic information extracted from a second sound signal that corresponds to a second channel among the plurality of sounds of the plurality of channels, wherein
  the second haptic-feedback presentation signal is sent to a second haptic-feedback presentation device of the plurality of haptic-feedback presentation devices,
  the first haptic-feedback presentation device is in a first end portion of the housing of a display screen and the second haptic-feedback presentation device is in a second end portion of the housing, the first end portion and the second end portion are in one coordinate axis direction of the display screen, the generated first haptic-feedback presentation signal has a time difference with respect to the generated second haptic-feedback presentation signal, and the time difference is based on a direction of movement of an object displayed on the display screen between the first end portion and the second end portion;

generating, in a case where the direction in the positional relationship is close to the direction of gravity, a monaural sound signal from a plurality of sound signals of the plurality of channels;

extracting, as third characteristic information, a low frequency component signal that belongs to a frequency band of a determined frequency or lower from the monaural sound signal;

generating the low frequency component signal as the first haptic-feedback presentation signal; and generating a signal having an opposite phase to the low frequency component signal as the second haptic-feedback presentation signal.

11. An information processing apparatus, comprising:
a control unit configured to:
receive a request from an information processing terminal through a network, wherein the information processing terminal includes a display screen;
determine a direction in a positional relationship between a plurality of haptic-feedback presentation devices is close to one of a direction of gravity or a horizontal direction,
wherein the direction in the positional relationship is based on a direction of a posture of a housing;
generate, in a case where the direction in the positional relationship is close to the horizontal direction, a first haptic-feedback presentation signal based on first characteristic information extracted from a first sound signal that corresponds to a first channel among a plurality of sounds of a plurality of channels output from a sound output device, wherein
the first haptic-feedback presentation signal is sent to a first haptic-feedback presentation device of the plurality of haptic-feedback presentation devices;
generate, in the case where the direction in the positional relationship is close to the horizontal direction, a second haptic-feedback presentation signal based on second characteristic information extracted from a second sound signal that corresponds to a second channel among the plurality of sounds of the plurality of channels, wherein
the second haptic-feedback presentation signal is sent to a second haptic-feedback presentation device of the plurality of haptic-feedback presentation devices,
the generated first haptic-feedback presentation signal has a time difference with respect to the generated second haptic-feedback presentation signal, and
the time difference is based on a direction of movement of an object displayed on the display screen;
generate, in a case where the direction in the positional relationship is close to the direction of gravity, a monaural sound signal from a plurality of sound signals of the plurality of channels;
extract, as third characteristic information, a low frequency component signal that belongs to a frequency band of a determined frequency or lower from the monaural sound signal;
generate the low frequency component signal as the first haptic-feedback presentation signal;
generate a signal having an opposite phase to the low frequency component signal as the second haptic-feedback presentation signal; and
transmit information of the first haptic-feedback presentation signal and the second haptic-feedback presentation signal to the information processing terminal through the network.

12. An information processing apparatus, comprising:
a plurality of haptic-feedback presentation devices;
a sound output device configured to output a plurality of sounds of a plurality of channels; and
an arithmetic processing unit configured to:
generate a first haptic-feedback presentation signal based on first characteristic information extracted from a first sound signal that corresponds to a first channel among the plurality of sounds of the plurality of channels,
wherein the generated first haptic-feedback presentation signal is sent to a first haptic-feedback presentation device of the plurality of haptic-feedback presentation devices; and
generate a second haptic-feedback presentation signal based on second characteristic information extracted from a second sound signal that corresponds to a second channel among the plurality of sounds of the plurality of channels, wherein
the generated second haptic-feedback presentation signal is sent to a second haptic-feedback presentation device of the plurality of haptic-feedback presentation devices,
the plurality of haptic-feedback presentation devices is in a housing,
the arithmetic processing unit is further configured to:
determine whether a direction in a positional relationship between the plurality of haptic-feedback presentation devices based on a direction of a posture of the housing is close to one of a direction of gravity or a horizontal direction; and
generate the first haptic-feedback presentation signal based on the first characteristic information and generate the second haptic-feedback presentation signal based on the second characteristic information in a case where the direction in the positional relationship is close to the horizontal direction, and
in a case where the direction in the positional relationship is close to the direction of gravity, the arithmetic processing unit is further configured to:
generate a monaural sound signal from a plurality of sound signals of the plurality of channels;
generate the first haptic-feedback presentation signal and the second haptic-feedback presentation signal based on the monaural sound signal;
extract third characteristic information from the monaural sound signal;
generate the first haptic-feedback presentation signal and the second haptic-feedback presentation signal based on the extracted third characteristic information;
extract a low frequency component signal that belongs to a frequency band of a determined frequency or lower from the monaural sound signal as the third characteristic information;

generate the low frequency component signal as the first haptic-feedback presentation signal; and generate a signal having an opposite phase to the low frequency component signal as the second haptic-feedback presentation signal.

* * * * *